(12) United States Patent
Hirota et al.

(10) Patent No.: US 7,986,151 B2
(45) Date of Patent: Jul. 26, 2011

(54) HEAD REST DEVICE FOR VEHICLE

(75) Inventors: Koichi Hirota, Takahama (JP); Koji Aoki, Nagoya (JP); Manabu Tsuruta, Toyota (JP); Kiyoka Matsubayashi, Aichi-gun (JP); Motomi Iyoda, Seto (JP); Tatsuhiro Okawa, Toyota (JP); Fumitoshi Akaike, Nisshin (JP)

(73) Assignees: Aisin Seiki Kabushiki Kaisha, Kariya-shi (JP); Toyota Jidosha Kabushiki Kaisha, Toyota-shi (JP); Toyota Boshoku Kabushiki Kaisha, Kariya-shi (JP)

( * ) Notice: Subject to any disclaimer, the term of this patent is extended or adjusted under 35 U.S.C. 154(b) by 297 days.

(21) Appl. No.: 12/094,166

(22) PCT Filed: Nov. 10, 2006

(86) PCT No.: PCT/JP2006/322454
§ 371 (c)(1),
(2), (4) Date: May 19, 2008

(87) PCT Pub. No.: WO2007/058122
PCT Pub. Date: May 24, 2007

(65) Prior Publication Data
US 2009/0096468 A1 Apr. 16, 2009

(30) Foreign Application Priority Data

Nov. 17, 2005 (JP) ................................. 2005-332649

(51) Int. Cl.
*G01R 27/26* (2006.01)

(52) U.S. Cl. ......... 324/662; 324/679; 324/686; 324/681
(58) Field of Classification Search .................. 324/681
See application file for complete search history.

(56) References Cited

U.S. PATENT DOCUMENTS

| 4,796,013 A | * | 1/1989 | Yasuda et al. | ................. 340/562 |
| 5,308,028 A | * | 5/1994 | Kornberg | ..................... 248/118 |
| 5,694,320 A |   | 12/1997 | Breed | |

(Continued)

FOREIGN PATENT DOCUMENTS

JP 7 67744 3/1995
(Continued)

OTHER PUBLICATIONS

U.S. Appl. No. 12/097,052, filed Jun. 12, 2008, Hirota, et al.

(Continued)

*Primary Examiner* — Thomas Valone
(74) *Attorney, Agent, or Firm* — Oblon, Spivak, McClelland, Maier & Neustadt, L.L.P.

(57) ABSTRACT

When moving a head rest front portion in a full-open position direction, an ECU determines that the head rest front portion comes close to an occupant head portion on the basis of a detection result of an electrostatic capacitance sensor so as to stop the head rest front portion, and determines that the head rest front portion comes close to the occupant head portion on the basis of an absolute capacitance change with respect to a reference electrostatic capacitance value of the electrostatic capacitance sensor. Alternatively, the ECU determines that the head rest front portion comes close to the occupant head portion on the basis of a change amount of the electrostatic capacitance value of the electrostatic capacitance sensor.

19 Claims, 11 Drawing Sheets

U.S. PATENT DOCUMENTS

| | | | |
|---|---|---|---|
| 6,051,981 A | 4/2000 | Gershenfeld et al. | |
| 6,275,146 B1 | 8/2001 | Kithil et al. | |
| 6,307,384 B2* | 10/2001 | Havey et al. | 324/662 |
| 6,402,195 B1 | 6/2002 | Eisenmann et al. | |
| 6,542,071 B1* | 4/2003 | Ohtsubo et al. | 340/426.28 |
| 6,623,073 B2* | 9/2003 | Schafer et al. | 297/216.12 |
| 6,746,078 B2 | 6/2004 | Breed | |
| 6,830,278 B2 | 12/2004 | Yoshizawa et al. | |
| 7,618,091 B2* | 11/2009 | Akaike et al. | 297/216.12 |
| 7,866,745 B2* | 1/2011 | Hirota et al. | 297/216.12 |
| 2006/0158319 A1* | 7/2006 | Kim | 340/425.5 |
| 2006/0175881 A1* | 8/2006 | Akaike et al. | 297/216.12 |
| 2007/0085400 A1* | 4/2007 | Terada et al. | 297/391 |
| 2007/0257528 A1 | 11/2007 | Akaike et al. | |
| 2008/0204264 A1* | 8/2008 | Sakai | 340/667 |
| 2009/0096468 A1* | 4/2009 | Hirota et al. | 324/681 |

FOREIGN PATENT DOCUMENTS

| | | |
|---|---|---|
| JP | 8 187139 | 7/1996 |
| JP | 2000 211410 | 8/2000 |
| JP | 2000-211410 | 8/2000 |
| JP | 2002-19555 | 1/2002 |
| JP | 2002 19555 | 1/2002 |
| JP | 2003 54343 | 2/2003 |
| JP | 2003-294855 | 10/2003 |
| JP | 2003 294855 | 10/2003 |
| JP | 2005 87650 | 4/2005 |
| WO | WO 2004/017521 A1 | 2/2004 |
| WO | 2005 073019 | 8/2005 |

OTHER PUBLICATIONS

Extended European Search Report issued Dec. 22, 2010, in Patent Application No. 06823286.7.

* cited by examiner

FIG. 9
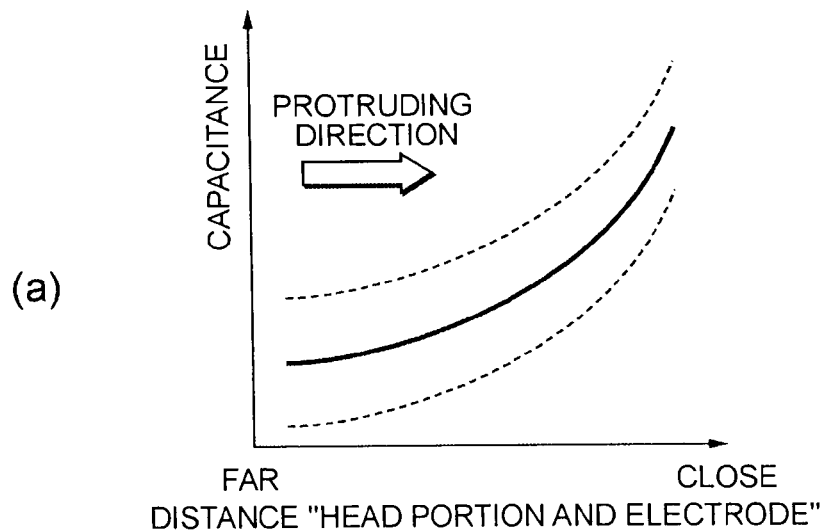
(a)
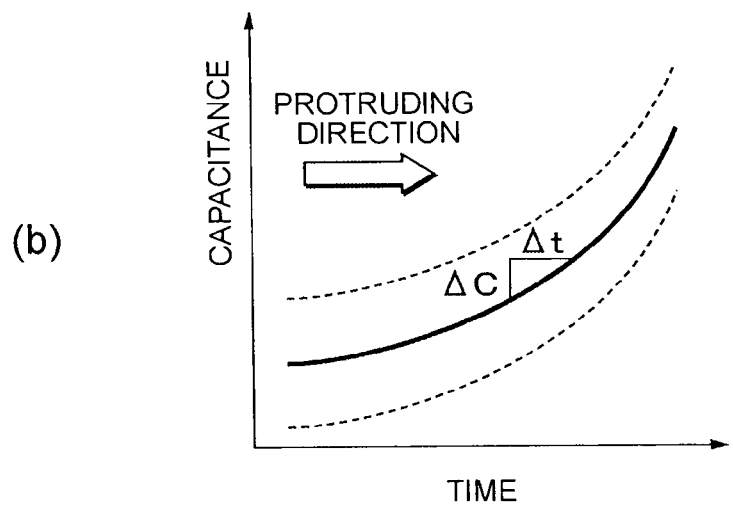
(b)
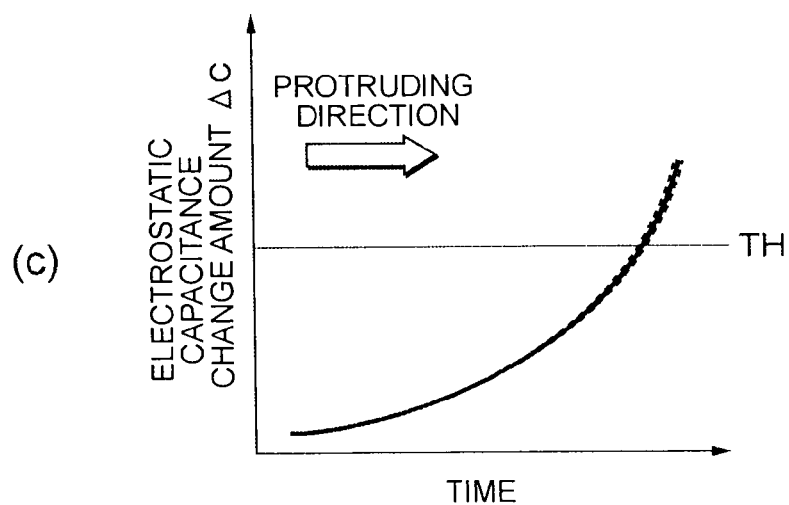
(c)

FIG. 11
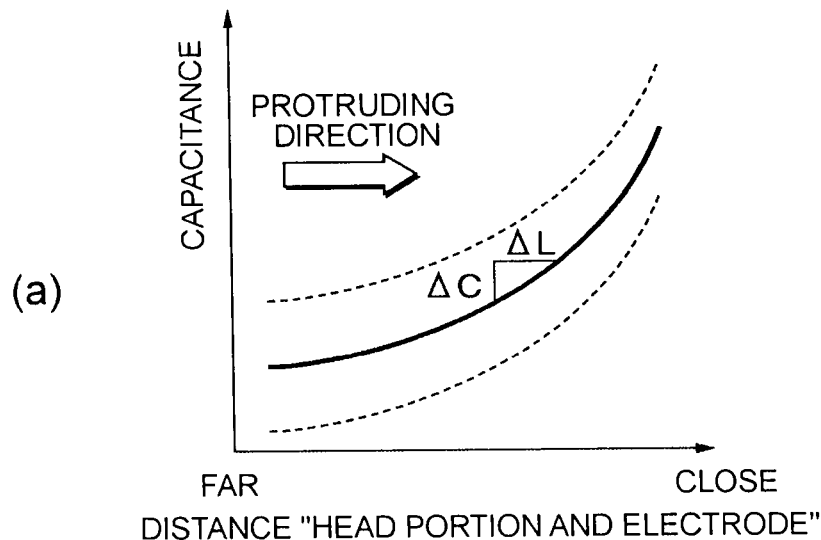
(a)
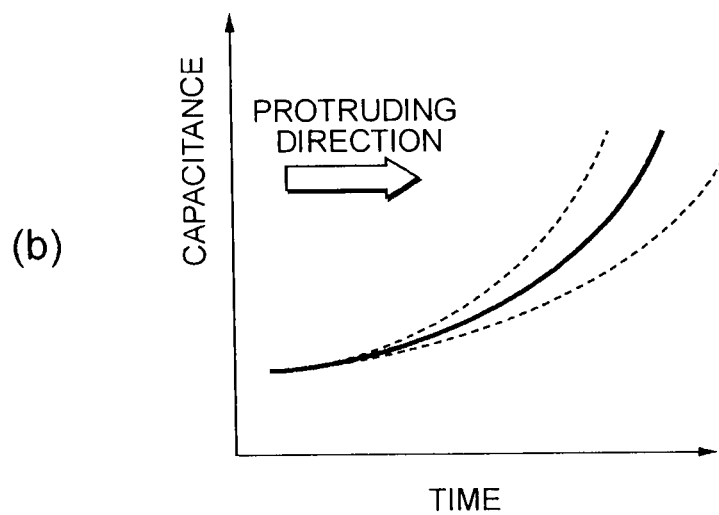
(b)
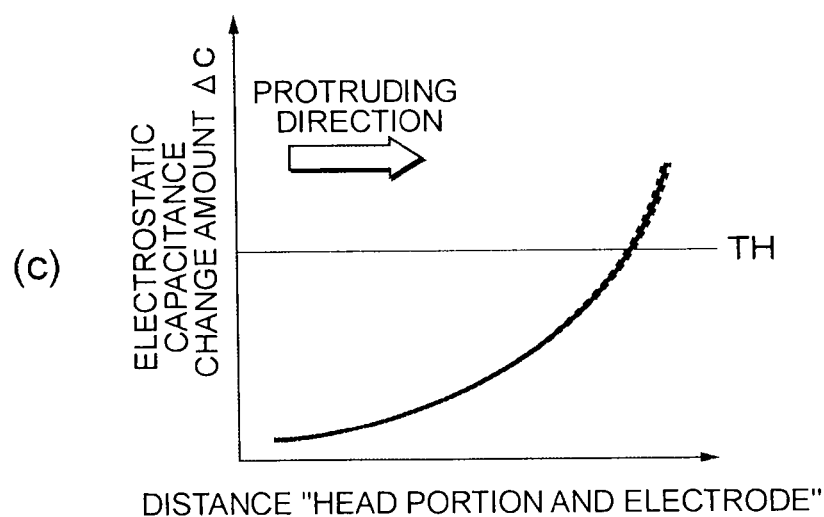
(c)

FIG.12
(a) 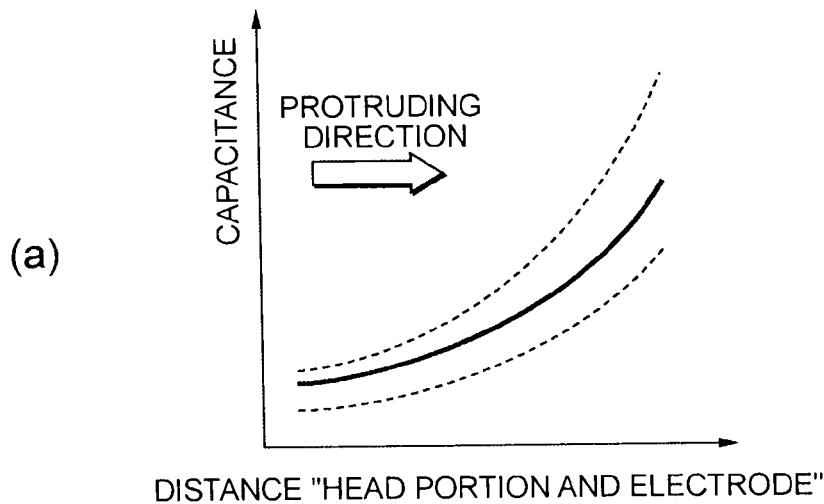
(b) 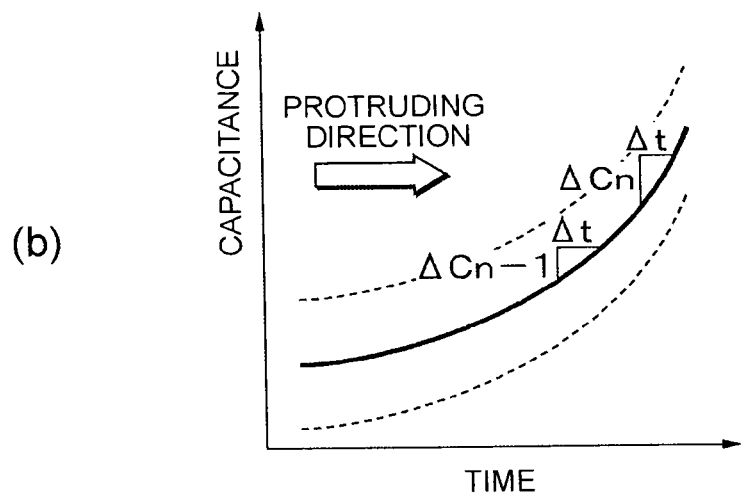
(c) 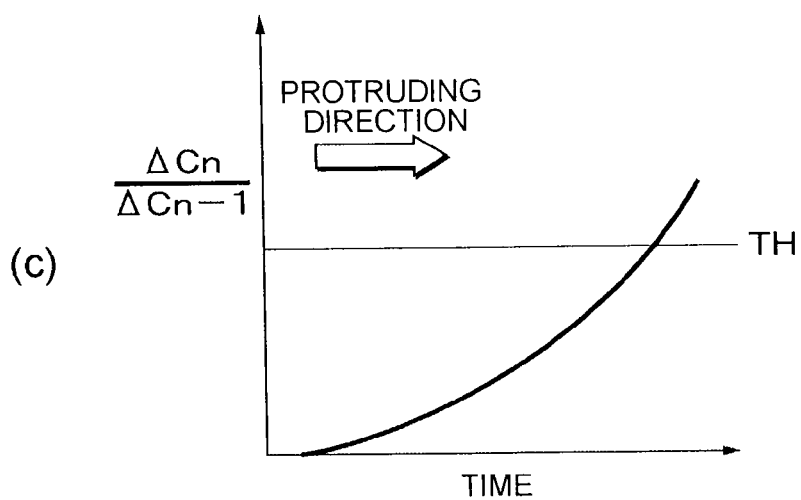

HEAD REST DEVICE FOR VEHICLE

TECHNICAL FIELD

The present invention relates to a head rest device for a vehicle provided in a vehicle such as a motor vehicle or the like.

BACKGROUND ART

Conventionally, there has been proposed a seat for a vehicle provided with a mechanism for moving a head rest to a front side of the vehicle, for protecting a head portion, a neck portion or the like of an occupant at a time of a collision from a rear side of the vehicle (for example, refer to Japanese Unexamined Patent Publication Nos. 2000-211410 and 2003-54343).

In the case that an impact is applied to the vehicle from the rear side, an upper half body of the occupant is constrained to a seat back, however, the neck portion which is not constrained is moved to the rear side in retard of the upper half body. At this time, there is a risk that a load is applied to the neck portion, however, if the head rest is moved to a front side of the vehicle with respect to the seat back in this case, the head portion of the occupant is held down. As a result the load applied to the neck portion of the occupant is reduced.

DISCLOSURE OF THE INVENTION

Problem to be Solved by the Invention

In the meanwhile, it is preferable to stop the head rest at a position just before the head portion of the occupant, at a time of moving the head rest to the front side of the vehicle, however, in order to stop the head rest at the position mentioned above, it is necessary to provide a sensor detecting a distance between the head rest and the head portion of the occupant. Further, the higher a precision of the sensor is, the better the position of the head rest can be aligned with the head portion of the occupant.

Accordingly, an object of the present invention is to provide a head rest device for a vehicle which can precisely detect a distance with respect to a head portion of an occupant.

Means for Solving the Problem

In order to achieve the object mentioned above, in accordance with the present invention, there is provided a head rest device for a vehicle comprising:

a head rest rear portion supported to a seat back;

a head rest front portion movable forward and backward between a full-close position which is close to the head rest rear portion, and a full-open position which is away from the head rest rear portion;

a drive means moving the head rest front portion;

an electrostatic capacitance sensor provided in the head rest front portion and structured such that an electrostatic capacitance is changed in accordance with a fluctuation of the distance with respect to the occupant head portion; and a control means controlling the drive means and determining an approach between the head rest front portion and the occupant head portion on the basis of a detection result of the electrostatic capacitance sensor so as to stop the head rest front portion at a time of moving the head rest front portion in the full-open position direction, wherein the control means sets an electrostatic capacitance value of the electrostatic capacitance sensor at a predetermined timing to a reference electrostatic capacitance value which is changeable in correspondence to the timing, and determines that the head rest front portion comes close to the occupant head portion on the basis of an absolute capacitance change with respect to the reference electrostatic capacitance value.

In accordance with the structure mentioned above, since it is determined that the head rest front portion comes close to the occupant head portion on the basis of the absolute capacitance change with respect to the reference electrostatic capacitance value of the electrostatic capacitance sensor which is changeable in correspondence to the predetermined timing, at a time of moving the head rest front portion in the full-open position direction, it is possible to precisely detect the distance with respect to the head portion of the occupant by setting the predetermined timing to an appropriate timing.

The control means may be structured such as to set an electrostatic capacitance value of the electrostatic capacitance sensor at a time of starting the movement of the head rest front portion in the full-open position direction to the reference electrostatic capacitance value, and determine that the head rest front portion comes close to the occupant head portion at a time when an increasing amount of the electrostatic capacitance value of the electrostatic capacitance sensor with respect to the reference electrostatic capacitance value becomes equal to or more than a predetermined threshold value.

In the head rest device for the vehicle in accordance with the present invention, the head rest device may be provided with a unlock detecting means detecting an unlock of a door of the vehicle, and the control means may set an electrostatic capacitance value of the electrostatic capacitance sensor at a time of detecting the unlock of the door of the vehicle by the unlock detecting means to the reference electrostatic capacitance value, and may determine that the head rest front portion comes close to the occupant head portion at a time when an increasing amount of the electrostatic capacitance value of the electrostatic capacitance sensor with respect to the reference electrostatic capacitance value becomes equal to or more than a predetermined threshold value.

In accordance with the structure mentioned above, since the reference electrostatic capacitance value is set to the electrostatic capacitance value of the electrostatic capacitance sensor at a time of detecting the unlock of the door of the vehicle by the unlock detecting means, that is, in a state in which the occupant head portion is away from the head rest front portion, it is possible to accurately determine the approach of the occupant head portion regardless of the position of the occupant head portion at a time of starting a protruding motion of the head rest front portion, for example, even in the case that the occupant head portion comes into contact with the head rest front portion before the head rest front portion moves in the full-open position direction, it is possible to determine the approach of the head portion before the protruding motion, and it is possible to prevent an unnecessary motion.

In the head rest device for the vehicle in accordance with the present invention, the head rest device may be provided with a door open detecting means detecting a door open of the vehicle, and the control means may set an electrostatic capacitance value of the electrostatic capacitance sensor at a time of detecting the door open of the vehicle by the door open detecting means to the reference electrostatic capacitance value, and may determine that the head rest front portion comes close to the occupant head portion at a time when an increasing amount of the electrostatic capacitance value of the electrostatic capacitance sensor with respect to the reference electrostatic capacitance value becomes equal to or more than a predetermined threshold value.

In accordance with the structure mentioned above, since the reference electrostatic capacitance value is set to the electrostatic capacitance value of the electrostatic capacitance sensor at a time of detecting the door open of the vehicle by the door open detecting means, that is, in a state in which the occupant head portion is away from the head rest front portion, it is possible to accurately determine the approach of the occupant head portion regardless of the position of the occupant head portion at a time of starting the protruding motion of the head rest front portion, for example, even in the case that the occupant head portion comes into contact with the head rest front portion before the head rest front portion moves in the full-open position direction, it is possible to determine the approach of the head portion before the protruding motion, and it is possible to prevent an unnecessary motion.

In the head rest device for the vehicle in accordance with the present invention, the head rest device may be provided with an ignition-on detecting means detecting an ignition-on of the vehicle, and the control means may set a minimum value of an electrostatic capacitance value of the electrostatic capacitance sensor after detecting the ignition-on by the ignition-on detecting means to the reference electrostatic capacitance value, and may determine that the head rest front portion comes close to the occupant head portion at a time when an increasing amount of the electrostatic capacitance value of the electrostatic capacitance sensor with respect to the reference electrostatic capacitance value becomes equal to or more than a predetermined threshold value.

In accordance with the structure mentioned above, since the reference electrostatic capacitance value is set to the minimum value of the electrostatic capacitance value of the electrostatic capacitance sensor after detecting the ignition-on by the ignition-on detecting means, that is, the electrostatic capacitance value of the electrostatic capacitance sensor at a time when the occupant head portion is most away from the head rest front portion, it is possible to accurately determine the approach of the occupant head portion regardless of the position of the occupant head portion at a time of starting the protruding motion of the head rest front portion, for example, even in the case that the occupant head portion comes into contact with the head rest front portion before the head rest front portion moves in the full-open position direction, it is possible to determine the approach of the head portion before the protruding motion, and it is possible to prevent an unnecessary motion.

In the head rest device for the vehicle in accordance with the present invention, the head rest device may be provided with an occupant detecting means detecting whether or not the occupant sits on a seat, and the control means may set an electrostatic capacitance value of the electrostatic capacitance sensor at a time when the occupant is not detected by the occupant detecting means to the reference electrostatic capacitance value, and may determine that the head rest front portion comes close to the occupant head portion at a time when an increasing amount of the electrostatic capacitance value of the electrostatic capacitance sensor with respect to the reference electrostatic capacitance value becomes equal to or more than a predetermined threshold value.

In accordance with the structure mentioned above, since the reference electrostatic capacitance value is set to the electrostatic capacitance value of the electrostatic capacitance sensor at a time when the occupant is not detected by the occupant detecting means, that is, the electrostatic capacitance value of the electrostatic capacitance sensor in a state in which the occupant head portion is away from the head rest front portion, it is possible to accurately determine the approach of the occupant head portion regardless of the position of the occupant head portion at a time of starting the protruding motion of the head rest front portion, for example, even in the case that the occupant head portion comes into contact with the head rest front portion before the head rest front portion moves in the full-open position direction, it is possible to determine the approach of the head portion before the protruding motion, and it is possible to prevent an unnecessary motion.

In the head rest device for the vehicle in accordance with the present invention, the head rest device may be provided with a contact detecting means detecting a contact of the occupant head portion with the head rest front portion, and the control means may set an electrostatic capacitance value of the electrostatic capacitance sensor at a time when the occupant head portion comes into contact by the contact detecting means to the reference electrostatic capacitance value, and may determine that the head rest front portion comes close to the occupant head portion at a time when a decreasing amount of the electrostatic capacitance value of the electrostatic capacitance sensor with respect to the reference electrostatic capacitance value becomes within a predetermined threshold value.

In accordance with the structure mentioned above, since the reference electrostatic capacitance value is set to the electrostatic capacitance value of the electrostatic capacitance sensor at a time when the occupant head portion comes into contact by the contact detecting means, that is, the substantially maximum electrostatic capacitance value, it is possible to accurately determine the approach of the occupant head portion regardless of the position of the occupant head portion at a time of starting the protruding motion of the head rest front portion, for example, even in the case that the occupant head portion comes into contact with the head rest front portion before the head rest front portion moves in the full-open position direction, it is possible to determine the approach of the head portion before the protruding motion, and it is possible to prevent an unnecessary motion.

In accordance with the other aspect of the present invention, there is provided a head rest device for a vehicle comprising:

a head rest rear portion supported to a seat back;

a head rest front portion movable forward and backward between a full-close position which is close to the head rest rear portion, and a full-open position which is away from the head rest rear portion;

a drive means moving the head rest front portion;

an electrostatic capacitance sensor provided in the head rest front portion and structured such that an electrostatic capacitance is changed in accordance with a fluctuation of the distance with respect to the occupant head portion; and a control means controlling the drive means and determining an approach between the head rest front portion and the occupant head portion on the basis of a detection result of the electrostatic capacitance sensor so as to stop the head rest front portion at a time of moving the head rest front portion in the full-open position direction, wherein the control means determines that the head rest front portion comes close to the occupant head portion on the basis of a change amount of the electrostatic capacitance value of the electrostatic capacitance sensor.

In accordance with the structure mentioned above, since it is determined that the head rest front portion comes close to the occupant head portion on the basis of the change amount of the electrostatic capacitance value of the electrostatic capacitance sensor, it is possible to exclude an error factor such as a temperature, a humidity and the like, and a detecting precision is not changed even if a parasitic capacitance at a time when the occupant does not exist is changed. Accordingly, it is possible to further precisely detect the distance with respect to the head portion of the occupant.

The control means may be structured such as to detect that the head rest front portion comes close to the occupant head portion at a time when the change amount of the electrostatic capacitance value per unit time of the electrostatic capacitance sensor gets over a predetermined threshold value on the basis of an actuating speed of the drive means.

In the head rest device for the vehicle in accordance with the present invention, the drive means may be provided with a mechanical stroke detecting means detecting a mechanical stroke of the head rest front portion, and the control means may determine that the head rest front portion comes close to the occupant head portion at a time when a change amount of the electrostatic capacitance value of the electrostatic capacitance sensor per a predetermined interval detected by the mechanical stroke detecting means gets over a predetermined threshold value.

In accordance with the structure mentioned above, since there is employed the change amount of the electrostatic capacitance value of the electrostatic capacitance sensor per the predetermined interval, the detecting precision is not changed even if the speed of the drive means is changed. Accordingly, it is possible to further precisely detect the distance with respect to the head portion of the occupant.

The control means may determine that the head rest front portion comes close to the occupant head portion at a time when a ratio of change amounts of the electrostatic capacitance value per unit time of the electrostatic capacitance sensor at a plurality of different times gets over a predetermined threshold value.

In accordance with the structure mentioned above, the detecting precision is not changed in accordance with an individual difference such as a magnitude and a shape of the occupant head portion, and a constitution or the like. Accordingly, it is possible to further precisely detect the distance with respect to the head portion of the occupant.

In accordance with the other aspect of the present invention, there is provided a head rest device for a vehicle comprising:

a head rest rear portion supported to a seat back;

a head rest front portion movable forward and backward between a full-close position which is close to the head rest rear portion, and a full-open position which is away from the head rest rear portion;

a drive means moving the head rest front portion;

an electrostatic capacitance sensor provided in the head rest front portion and structured such that an electrostatic capacitance is changed in accordance with a fluctuation of the distance with respect to the occupant head portion; and a control means controlling the drive means and determining an approach between the head rest front portion and the occupant head portion on the basis of a detection result of the electrostatic capacitance sensor so as to stop the head rest front portion at a time of moving the head rest front portion in the full-open position direction, wherein the control means determines that the head rest front portion comes close to the occupant head portion on the basis of an absolute capacitance change with respect to a reference electrostatic capacitance value which is set by an electrostatic capacitance value of the electrostatic capacitance sensor at a predetermined timing and is changeable in accordance with the timing, and a change amount of the electrostatic capacitance value of the electrostatic capacitance sensor.

The control means may determine that the head rest front portion comes close to the occupant head portion in the case of determining that any one of an approach determination on the basis of the absolute capacitance change and an approach determination on the basis of the change amount of the electrostatic capacitance value is faster than the other.

The approach determination on the basis of the absolute capacitance change may be constituted by at least one determination of the determinations mentioned above, the approach determination on the basis of the change amount of the electrostatic capacitance value may be constituted by at least one determination of the determinations mentioned above, and it may be determined that the head rest front portion comes close to the occupant head portion in the case determining that any one of them comes close fastest.

The control means may be provided with an electrostatic capacitance sensor circuit determining an electrostatic capacitance value of the electrostatic capacitance sensor, a memory storing the reference electrostatic capacitance value, and a central processing unit determining that the head rest front portion comes close to the occupant head portion on the basis of an absolute capacitance change with respect to the reference electrostatic capacitance value stored in the memory.

The control means may be provided with an electrostatic capacitance sensor circuit determining an electrostatic capacitance value of the electrostatic capacitance sensor, a memory storing a threshold value used for determining the approach between the head rest front portion and the occupant head portion, and a central processing unit determining that the head rest front portion comes close to the occupant head portion on the basis of the threshold value stored in the memory and a change amount of the electrostatic capacitance value of the electrostatic capacitance sensor.

The control means may be provided with an electrostatic capacitance sensor circuit determining an electrostatic capacitance value of the electrostatic capacitance sensor, a memory storing the reference electrostatic capacitance value and a predetermined threshold value used for determining the approach between the head rest front portion and the occupant head portion, and a central processing unit determining that the head rest front portion comes close to the occupant head portion, and the central processing unit may determine that the head rest front portion comes close to the occupant head portion, by using an approach determination on the basis of an absolute capacitance change with respect to the reference electrostatic capacitance value stored in the memory, and an approach determination on the basis of the threshold value and the change amount of the electrostatic capacitance value.

The central processing unit may determine that the head rest front portion comes close to the occupant head portion, in the case of determining that one of the approach determination on the basis of the absolute capacitance change and the approach determination on the basis of the threshold value and the change amount of the electrostatic capacitance value approaches faster than the other.

Effect of the Invention

In accordance with the present invention, it is possible to precisely detect the distance with respect to the head portion of the occupant.

BRIEF DESCRIPTION OF THE DRAWINGS

FIGS. 9A, 9B and 9C are characteristic graphs for explaining a control content of the head rest device for the vehicle;

FIGS. 11A, 11B and 11C are characteristic graphs for explaining a control content of the head rest device for the vehicle; and FIGS. 12A, 12B and 12C are characteristic graphs for explaining a control content of the head rest device for the vehicle.

DESCRIPTION OF REFERENCE NUMERALS

3 . . . seat back, 10 . . . head rest device for vehicle, 11 . . . head rest rear portion, 12 . . . head rest front portion, 12A . . . full-close position, 12B . . . full-open position, 13 . . . motor (drive means), 14 . . . electrostatic capacitance sensor, 15 . . . drive mechanism (drive means), 20 . . . ECU (control means), 27 . . . ignition switch (ignition-on detecting means), 28 . . . door lock device (unlock detecting means), 29 . . . door open and close sensor (door open detecting means), 30 . . . touch sensor (occupant detecting means), 31 . . . touch sensor (contact detecting means), 32 . . . Hall IC (mechanical stroke detecting means).

BEST MODE FOR CARRYING OUT THE INVENTION

A description will be given below of a first embodiment in accordance with the present invention with reference to FIGS. 1 to 4.

Figure 1:
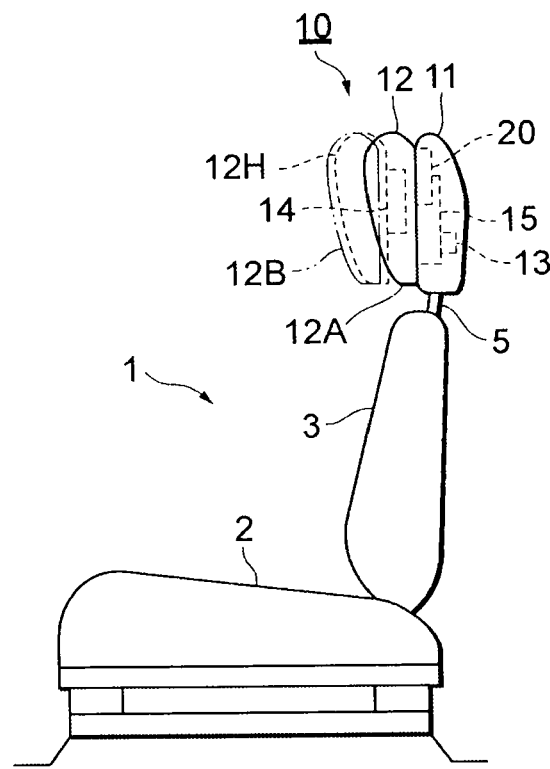
FIG. 1 is a side elevational view of a seat for a vehicle.
Figure 2:
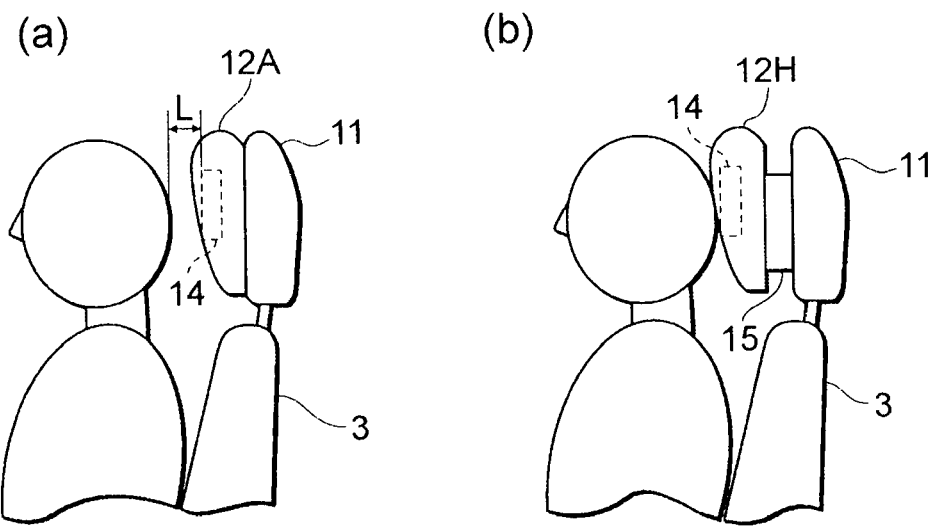
FIGS. 2A and 2B are side elevational views explaining an actuation of a head rest front portion.

FIG. 1 shows a side elevational view of a seat 1 for a vehicle to which a head rest device for a vehicle in accordance with the present invention is applied. The seat 1 for the vehicle is arranged in an assistant driver seat side of the vehicle. As shown in FIG. 1, the seat 1 for the vehicle is provided with a sitting seat 2, a seat back 3 supported to the sitting seat 2 so as to move obliquely, and a head rest device 10 for the vehicle.

The head rest device 10 for the vehicle is provided with a head rest rear portion 11, a head rest front portion 12, a motor 13 serving as a drive means moving the head rest front portion 12 with respect to the head rest rear portion 11, an electrostatic capacitance sensor 14 provided in the head rest front portion 12, and an electronic control unit (ECU) 20 serving as a control means controlling the drive of the motor 13 on the basis of a detection result of the electrostatic capacitance sensor 14 or the like.

The head rest rear portion 11 is supported to a head rest stay 5 provided in an upper end portion of the seat back 3.

The head rest front portion 12 is structured such as to be movable forward and backward between a full-close position 12A which comes close to the head rest rear portion 11 as shown by a solid line in FIG. 1 and a full-open position 12B which is away from the head rest rear portion 11 as shown by a two-dot chain line in FIG. 1. At a time of a normal operation of the vehicle, the head rest front portion 12 is arranged in the full-close position 12A.

A drive mechanism 15 serving as the drive means is provided between the head rest rear portion 11 and the head rest front portion 12, and the drive mechanism 15 is driven by the motor 13 so as to be expanded and contracted, whereby the head rest front portion 12 is moved forward and backward with respect to the head rest rear portion 11.

The electrostatic capacitance sensor 14 is provided in the head rest front portion 12, and corresponds to an electrostatic capacitance type sensor 14 having a known structure in which an electrostatic capacitance is changed in accordance with a fluctuation of a distance L shown in FIG. 2A with respect to a detected subject, that is, a head portion of an occupant. In the electrostatic capacitance sensor 14, in accordance that the head portion of the occupant comes close to the electrostatic capacitance sensor 14, a detected electrostatic capacitance value becomes basically large.

If a collision from a rear side of the vehicle is forecasted, the ECU 20 controls the motor 13 so as to return to the original full-close position 12A in the case that the collision from the rear side of the vehicle is avoided after moving the head rest front portion 12 from the full-close position 12A to the direction of the full-open position 12B.

Further, at a time of moving the head rest front portion 12 in the full-open position direction, the ECU 20 determines an approach between the head rest front portion 12 and the head portion of the occupant on the basis of the detection result of the electrostatic capacitance sensor 14, in detail, detects that the electrostatic capacitance sensor 14, that is, the head rest front portion 12 comes close to the head portion of the occupant on the basis of an absolute capacitance change with respect to a reference electrostatic capacitance value of the electrostatic capacitance sensor 14.

In more detail, the ECU 20 sets the electrostatic capacitance value of the electrostatic capacitance sensor 14 at a time point of starting the movement in the full-open position direction of the head rest front portion 12 to the reference electrostatic capacitance value at a time of moving the head rest front portion 12 in the full-open position direction, and determines that the head rest front portion 12 comes close to the head portion of the occupant at a time when an increasing amount of the electrostatic capacitance value of the electrostatic capacitance sensor 14 with respect to the reference electrostatic capacitance value becomes equal to or more than a predetermined threshold value.

Further, the ECU 20 moves the head rest front portion 12 in the full-open position direction. If the ECU 20 determines that the head rest front portion 12 comes close to the head portion of the occupant, the ECU 20 stops the movement of the head rest front portion 12 at a stop position 12H coming close to the head portion as shown in FIG. 2B. Further, the ECU 20 moves the head rest front portion 12 in the full-open position direction. In the case that the approach between the head rest front portion 12 and the head portion of the occupant is not detected, the ECU 20 moves the head rest front portion 12 to the full-open position 12B shown in FIG. 1 so as to stop.

Next, a description will be given of an electric structure of the head rest device 10 for the vehicle mentioned above.

Figure 3:
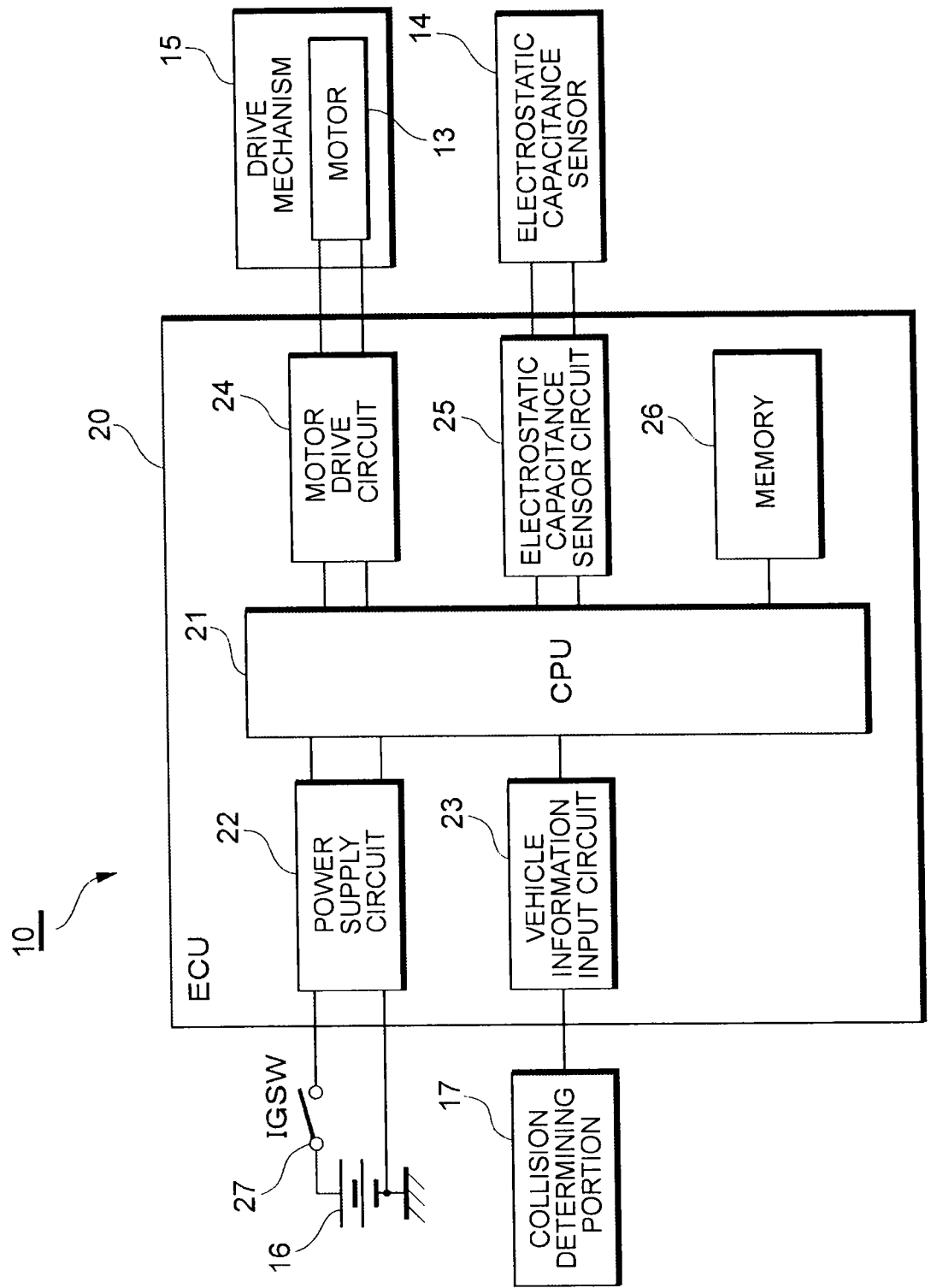
FIG. 3 is a block diagram showing an electric structure of a head rest device for a vehicle.

As shown in FIG. 3, the head rest device 10 for the vehicle is structured such as to be provided with the ECU 20, and the motor 13, the electrostatic capacitance sensor 14, an electric power unit 16 and a collision determining portion 17 which are connected to the ECU 20.

Further, the ECU 20 is structured such as to be provided with a central processing unit (CPU) 21, and a power supply circuit 22, a vehicle information input circuit 23, a motor drive circuit 24, an electric capacitance sensor circuit 25 and a memory 26 which are connected to the CPU 21.

The CPU 21 is connected to the electric power unit 16 via an ignition switch (IGSW) 27, and is structured such that an electric power is fed from the electric power unit 16 via the power supply circuit 22 on the basis of an ON operation of the ignition switch 27.

Further, the CPU 21 inputs a vehicle information such as a backward approach information or the like from the collision determining portion 17 via the vehicle information input circuit 23. The collision determining portion 17 is connected to a radar (not shown) installed in a bumper in a rear portion of the vehicle, inputs a signal from the radar so as to comprehensively determine a relative speed and a distance with respect to the trailing vehicle and a speed of the vehicle, and determines whether or not the trailing vehicle comes into collision with its own vehicle, or whether or not there is a possibility that the trailing vehicle comes into contact with its own vehicle.

The ECU 20 outputs the determination result to the vehicle information input circuit 23. Further, the CPU 21 is connected to the motor 13 via the motor drive circuit 24, and controls the motor drive circuit 24 so as to drive the motor 13. Further, the electrostatic capacitance sensor circuit 25 determines the electrostatic capacitance value of the electrostatic capacitance sensor 14.

Further, in the case that a collision from the backward side of the vehicle is forecasted and the head rest front portion 12 is moved in the full-open position direction, the CPU 21 stores the electrostatic capacitance value of the electrostatic capacitance sensor 14 at a time point of starting the movement in the full-open position direction of the head rest front portion 12 as the electrostatic capacitance value in the memory 26, determines that the head rest front portion 12 comes close to the head portion of the occupant at a time when the increasing amount of the electrostatic capacitance value of the electrostatic capacitance sensor 14 with respect to the reference electrostatic capacitance value becomes equal to or more than a predetermined threshold value TH, and stops the head rest front portion 12.

Figure 4:
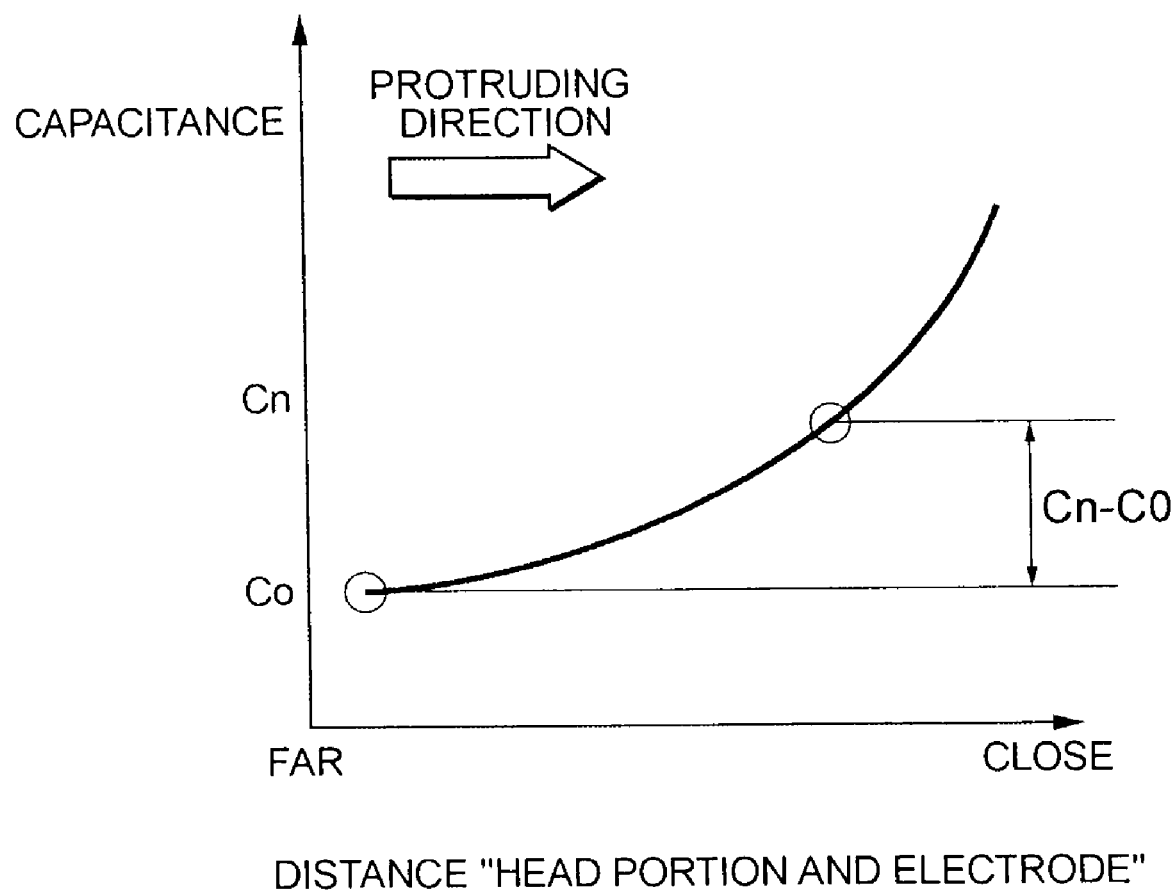
FIG. 4 is a characteristic graph for explaining a control content of the head rest device for the vehicle.

In other words, on the assumption that the distance between the head portion of the occupant and the electrostatic capacitance sensor 14 is set to a horizontal axis, and the electrostatic capacitance of the electrostatic capacitance sensor 14 is set to a vertical axis, an electrostatic capacitance value Cn becomes large little by little if the distance between the head portion of the occupant and the electrostatic capacitance sensor 14 comes close to a reference electrostatic capacitance value C0 corresponding to the electrostatic capacitance value of the electrostatic capacitance sensor 14 at a time point of starting the movement in the full-open position direction of the head rest front portion 12, as shown in FIG. 4. Further, because of a curved characteristic that a gradient is enlarged to be steep in accordance that the distance between the head portion of the occupant and the electrostatic capacitance sensor 14 comes closer, the head portion approach is determined in the case that the electrostatic capacitance value Cn during a protruding motion of the head rest front portion 12 is increased at a preset threshold value TH (for example, 1 pF) or more with respect to the reference electrostatic capacitance value C0 stored in the memory 26.

In accordance with the first embodiment mentioned above, since the electrostatic capacitance value of the electrostatic capacitance sensor 14 at a time point of starting the movement is set to the reference electrostatic capacitance value C0 in the case of moving the head rest front portion 12 in the full-open position direction, and it is determined that the head rest front portion 12 comes close to the head portion of the occupant in the case that the increasing amount of the electrostatic capacitance value Cn of the electrostatic capacitance sensor 14 with respect to the reference electrostatic capacitance value C0 becomes equal to or more than the predetermined threshold value TH, it is possible to precisely detect the distance with respect to the head portion of the occupant.

Next, a description will be given below of a second embodiment in accordance with the present invention while centering on a different portion from the first embodiment mainly with reference to FIG. 5.

Figure 5:
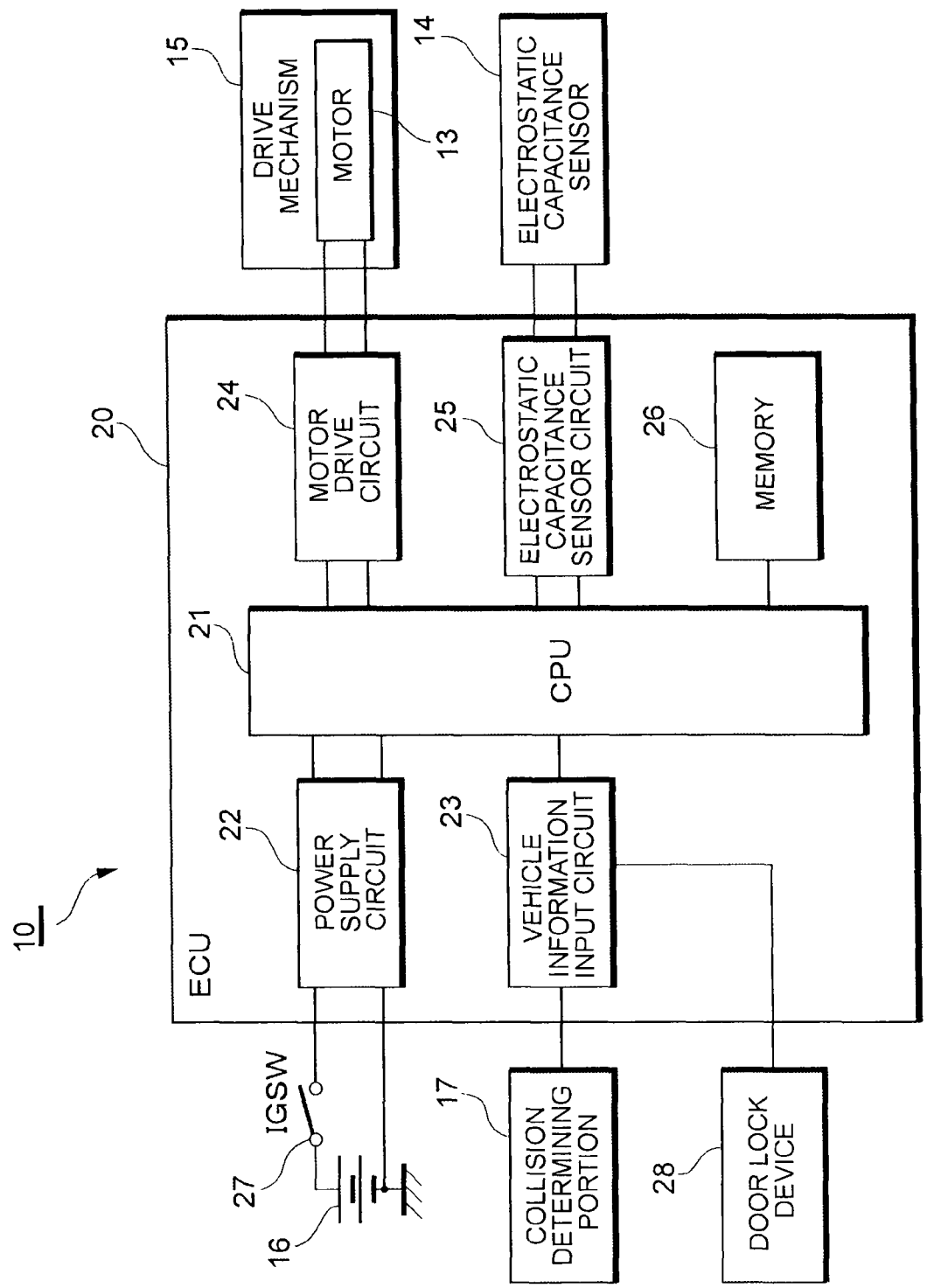
FIG. 5 is a block diagram showing the electric structure of the head rest device for the vehicle.

FIG. 5 is a block diagram showing an electric structure of a head rest device 10 for a vehicle in accordance with the second embodiment. In the second embodiment, in addition to the structure of the head rest device 10 for the vehicle in accordance with the first embodiment mentioned above, a door lock device 28 serving as the unlock detecting means detecting the unlock of the door of the vehicle is connected to the ECU 20.

In the second embodiment, in the same manner as the first embodiment, the ECU 20 determines that the head rest front portion 12 comes close to the head portion of the occupant, on the basis of the absolute capacitance change with respect to the reference electrostatic capacitance value C0 of the electrostatic capacitance sensor 14, however, the setting method of the reference electrostatic capacitance value C0 is different from the first embodiment mentioned above.

In specific, in the second embodiment, the CPU 21 of the ECU 20 stores an electrostatic capacitance value of the electrostatic capacitance sensor 14 at a time of detecting the unlock of the door of the vehicle by the door lock device 28 as the reference electrostatic capacitance value C0 in the memory 26. In the case that the increasing amount of the electrostatic capacitance value Cn of the electrostatic capacitance sensor 14 with respect to the reference electrostatic capacitance value C0 becomes equal to or more than the predetermined threshold value TH (for example, 1 pF) at a time when the collision from the backward side of the vehicle is forecasted and the head rest front portion 12 is moved in the full-open position direction, the CPU 21 determines that the head rest front portion 12 comes close to the head portion of the occupant, and stops the head rest front portion 12.

In accordance with the second embodiment mentioned above, in the case of storing the electrostatic capacitance value of the electrostatic capacitance sensor 14 at a time of detecting the unlock of the door of the vehicle by the door lock device 28 as the reference electric capacitance value C0 in the memory 26, and moving the head rest front portion 12 in the full-open position direction, since it is determined that the head rest front portion 12 comes close to the head portion of the occupant at a time when the increasing amount of the electrostatic capacitance value Cn of the electrostatic capacitance sensor 14 with respect to the reference electrostatic capacitance value C0 becomes equal to or more than the predetermined threshold value TH, it is possible to precisely detect the distance with respect to the head portion of the occupant.

Further, since the reference electrostatic capacitance value C0 is set to the electrostatic capacitance value of the electrostatic capacitance sensor 14 at a time of detecting the unlock of the door of the vehicle by the door lock device 28, that is, in a state in which the head portion of the occupant is away from the head rest front portion 12, it is possible to accurately determine the approach of the head portion of the occupant regardless of the position of the head portion of the occupant at a time of starting the protruding motion of the head rest front portion 12. For example, even in the case that the head portion of the occupant comes into contact with the head rest front portion 12 before the head rest front portion 12 moves in the full-open position direction, it is possible to determine the approach of the head portion before the protruding motion, and it is possible to prevent an unnecessary motion.

Next, a description will be given below of a third embodiment in accordance with the present invention while centering on a different portion from the first embodiment mainly with reference to FIG. 6.

Figure 6:
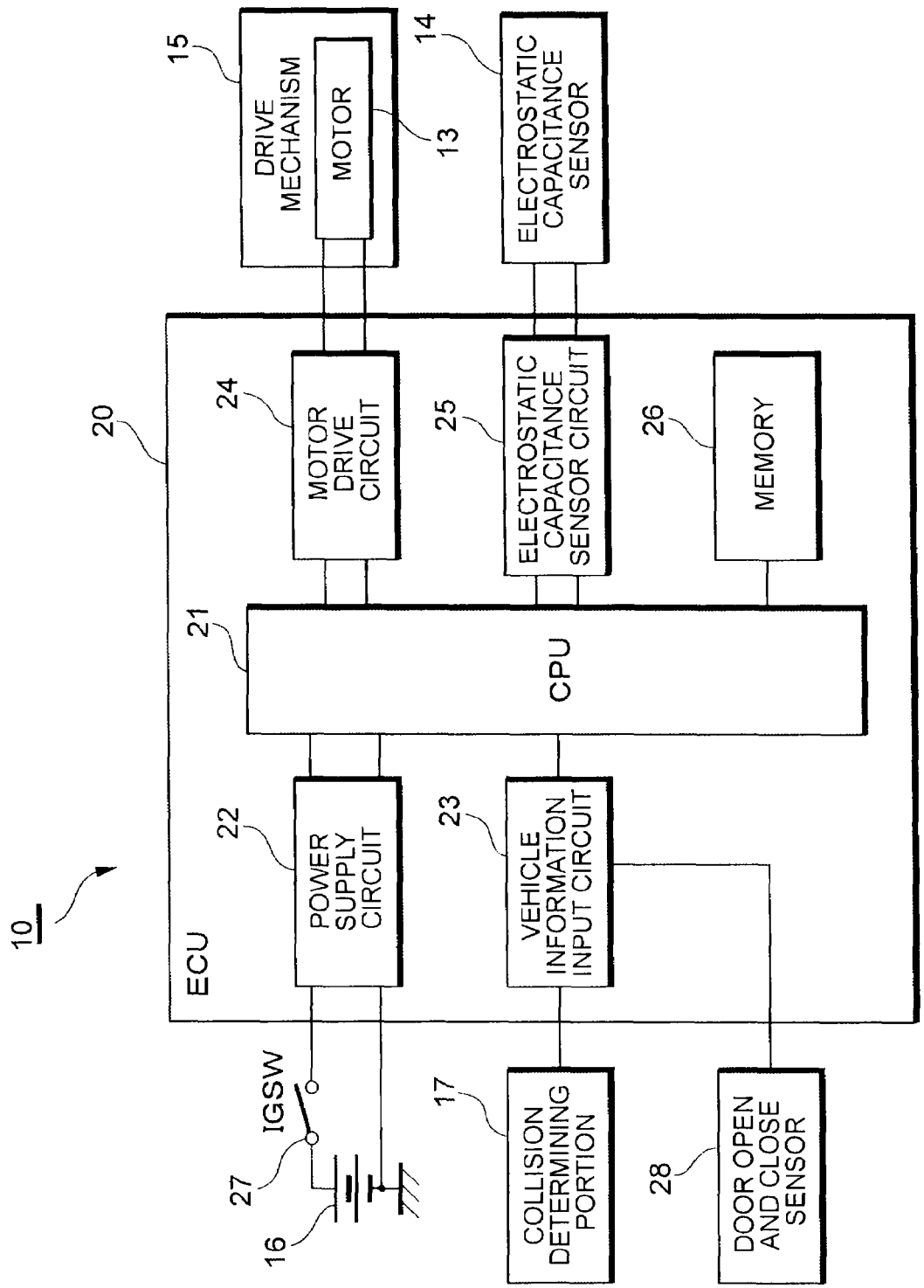
FIG. 6 is a block diagram showing the electric structure of the head rest device for the vehicle.

FIG. 6 is a block diagram showing an electric structure of a head rest device 10 for a vehicle in accordance with the third embodiment. In the third embodiment, in addition to the structure of the head rest device 10 for the vehicle in accordance with the first embodiment mentioned above, a door open and close sensor 29 serving as the door open detecting means detecting the door open of the door of the vehicle is connected to the ECU 20.

In the third embodiment, in the same manner as the first embodiment, the ECU 20 determines that the head rest front portion 12 comes close to the head portion of the occupant, on the basis of the absolute capacitance change with respect to the reference electrostatic capacitance value C0 of the electrostatic capacitance sensor 14, however, the setting method of the reference electrostatic capacitance value C0 is different from the first embodiment mentioned above.

In specific, in the third embodiment, the CPU 21 of the ECU 20 stores an electrostatic capacitance value of the electrostatic capacitance sensor 14 at a time of detecting the door open of the door of the vehicle by the door open and close sensor 29 as the reference electrostatic capacitance value C0 in the memory 26. In the case that the increasing amount of the electrostatic capacitance value Cn of the electrostatic capacitance sensor 14 with respect to the reference electrostatic capacitance value C0 becomes equal to or more than the predetermined threshold value TH (for example, 1 pF) at a time when the collision from the backward side of the vehicle is forecasted and the head rest front portion 12 is moved in the full-open position direction, the CPU 21 determines that the head rest front portion 12 comes close to the head portion of the occupant, and stops the head rest front portion 12.

In accordance with the third embodiment mentioned above, in the case of storing the electrostatic capacitance value of the electrostatic capacitance sensor 14 at a time of detecting the door open of the door of the vehicle by the door open and close sensor 29 as the reference electric capacitance value C0 in the memory 26, and moving the head rest front portion 12 in the full-open position direction, since it is determined that the head rest front portion 12 comes close to the head portion of the occupant at a time when the increasing amount of the electrostatic capacitance value Cn of the electrostatic capacitance sensor 14 with respect to the reference electrostatic capacitance value C0 becomes equal to or more than the predetermined threshold value TH, it is possible to precisely detect the distance with respect to the head portion of the occupant.

Further, since the reference electrostatic capacitance value C0 is set to the electrostatic capacitance value of the electrostatic capacitance sensor 14 at a time of detecting the door open of the door of the vehicle by the door open and close sensor 29, that is, in a state in which the head portion of the occupant is away from the head rest front portion 12, it is possible to accurately determine the approach of the head portion of the occupant regardless of the position of the head portion of the occupant at a time of starting the protruding motion of the head rest front portion 12. For example, even in the case that the head portion of the occupant comes into contact with the head rest front portion 12 before the head rest front portion 12 moves in the full-open position direction, it is possible to determine the approach of the head portion before the protruding motion, and it is possible to prevent an unnecessary motion.

Next, a description will be given below of a fourth embodiment in accordance with the present invention while centering on a different portion from the first embodiment mainly with reference to FIG. 3.

In the fourth embodiment, in the same manner as the first embodiment, the ECU 20 determines that the head rest front portion 12 comes close to the head portion of the occupant, on the basis of the absolute capacitance change with respect to the reference electrostatic capacitance value C0 of the electrostatic capacitance sensor 14, however, the setting method of the reference electrostatic capacitance value C0 is different from the first embodiment mentioned above.

In specific, in the fourth embodiment, the CPU 21 of the ECU 20 updates and stores a minimum value of an electrostatic capacitance value of the electrostatic capacitance sensor after detecting an ignition-on by an ignition switch 27 serving as the ignition-on detecting means. In the case that the increasing amount of the electrostatic capacitance value Cn of the electrostatic capacitance sensor 14 with respect to the reference electrostatic capacitance value C0 stores in the memory 26 at a time point of starting the movement becomes equal to or more than the predetermined threshold value TH (for example, 1 pF) at a time when the collision from the backward side of the vehicle is forecasted and the head rest front portion 12 is moved in the full-open position direction, the CPU 21 determines that the head rest front portion 12 comes close to the head portion of the occupant, and stops the head rest front portion 12.

In accordance with the fourth embodiment mentioned above, in the case of updating and storing the minimum value of the electrostatic capacitance value of the electrostatic capacitance sensor 14 after detecting the ignition-on by the ignition-on switch 27 as the reference electric capacitance value C0 in the memory 26, and moving the head rest front portion 12 in the full-open position direction, since it is determined that the head rest front portion 12 comes close to the head portion of the occupant at a time when the increasing amount of the electrostatic capacitance value Cn of the electrostatic capacitance sensor 14 with respect to the reference electrostatic capacitance value C0 becomes equal to or more than the predetermined threshold value TH, it is possible to precisely detect the distance with respect to the head portion of the occupant.

Further, since the reference electrostatic capacitance value C0 is set to the minimum value of the electrostatic capacitance value of the electrostatic capacitance sensor 14 after detecting the ignition-on by the ignition switch 27, that is, the electrostatic capacitance value of the electrostatic capacitance sensor 14 at a time when the head portion of the occupant is most away from the head rest front portion 12, it is possible to accurately determine the approach of the head portion of the occupant regardless of the position of the head portion of the occupant at a time of starting the protruding motion of the head rest front portion 12. For example, even in the case that the head portion of the occupant comes into contact with the head rest front portion 12 before the head rest front portion 12 moves in the full-open position direction, it is possible to determine the approach of the head portion before the protruding motion, and it is possible to prevent an unnecessary motion.

Next, a description will be given below of a fifth embodiment in accordance with the present invention while centering on a different portion from the first embodiment mainly with reference to FIG. 7.

Figure 7:
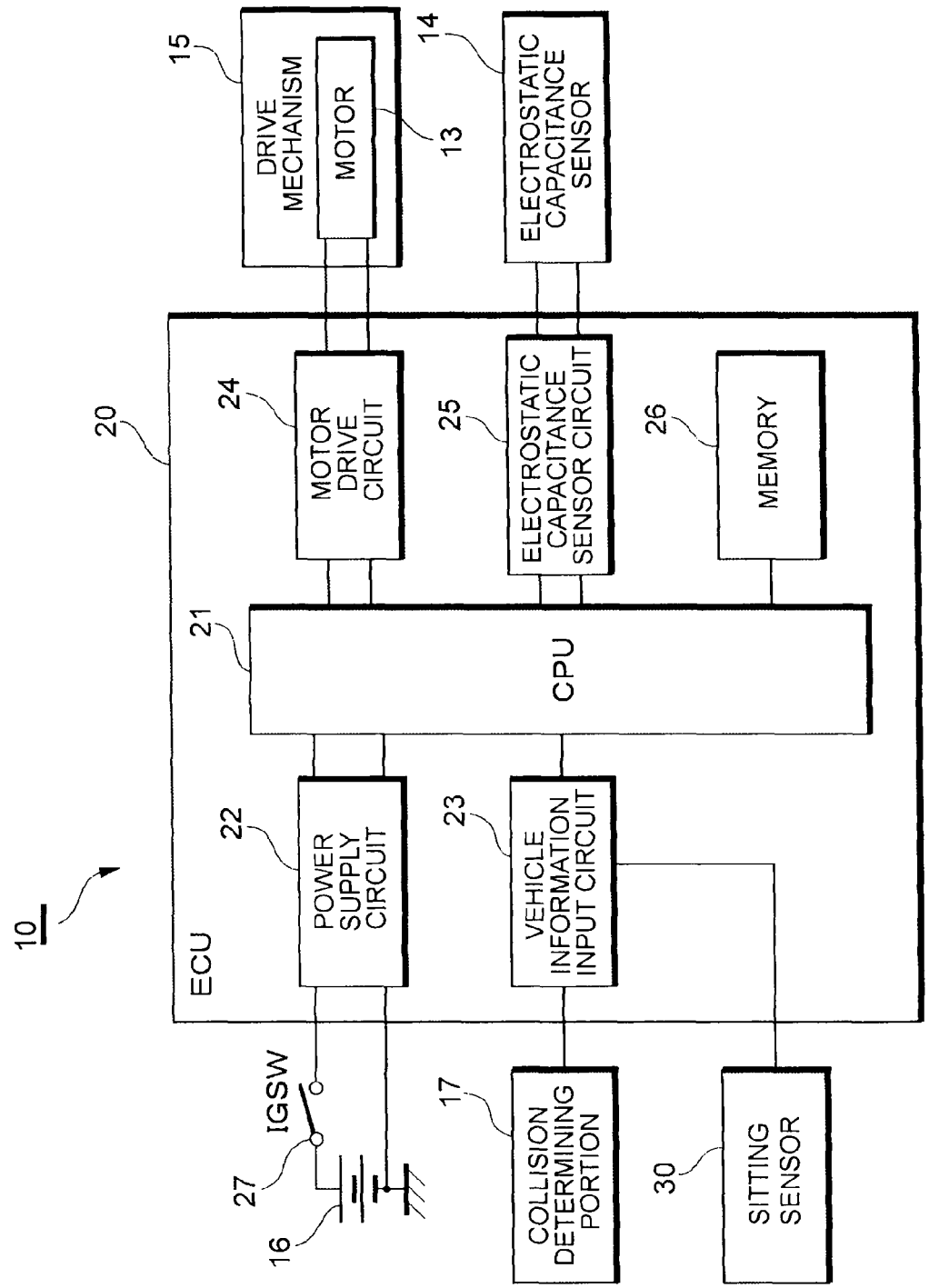
FIG. 7 is a block diagram showing the electric structure of the head rest device for the vehicle.

FIG. 7 is a block diagram showing an electric structure of a head rest device 10 for a vehicle in accordance with the fifth embodiment. In the fifth embodiment, in addition to the structure of the head rest device 10 for the vehicle in accordance with the first embodiment mentioned above, a sitting sensor 30 serving as the occupant detecting means detecting whether or not the occupant sits on the seat is connected to the ECU 20.

In the fifth embodiment, in the same manner as the first embodiment, the ECU 20 determines that the head rest front portion 12 comes close to the head portion of the occupant, on the basis of the absolute capacitance change with respect to the reference electrostatic capacitance value C0 of the electrostatic capacitance sensor 14, however, the setting method of the reference electrostatic capacitance value C0 is different from the first embodiment mentioned above.

In specific, in the fifth embodiment, the CPU 21 of the ECU 20 stores an electrostatic capacitance value of the electrostatic capacitance sensor 14 at a time of detecting that the occupant does not sit by the sitting sensor 30 as the reference electrostatic capacitance value C0 in the memory 26. In the case that the increasing amount of the electrostatic capacitance value Cn of the electrostatic capacitance sensor 14 with respect to the electrostatic capacitance value C0 becomes equal to or more than the predetermined threshold value TH (for example, 1 pF) at a time when the collision from the backward side of the vehicle is forecasted and the head rest front portion 12 is moved in the full-open position direction, the CPU 21 determines that the head rest front portion 12 comes close to the head portion of the occupant, and stops the head rest front portion 12.

In accordance with the fifth embodiment mentioned above, in the case of storing the electrostatic capacitance value of the electrostatic capacitance sensor 14 at a time when the occupant is not detected by the sitting sensor 30 as the reference electric capacitance value C0 in the memory 26, and moving the head rest front portion 12 in the full-open position direction, since it is determined that the head rest front portion 12 comes close to the head portion of the occupant at a time when the increasing amount of the electrostatic capacitance value Cn of the electrostatic capacitance sensor 14 with respect to the reference electrostatic capacitance value C0 becomes equal to or more than the predetermined threshold value TH, it is possible to precisely detect the distance with respect to the head portion of the occupant.

Further, since the reference electrostatic capacitance value C0 is set to the electrostatic capacitance value of the electrostatic capacitance sensor 14 at a time when the occupant is not detected by the sitting sensor 30, that is, in a state in which the head portion of the occupant is away from the head rest front portion 12, it is possible to accurately determine the approach of the head portion of the occupant regardless of the position of the head portion of the occupant at a time of starting the protruding motion of the head rest front portion 12. For example, even in the case that the head portion of the occupant comes into contact with the head rest front portion 12 before the head rest front portion 12 moves in the full-open position direction, it is possible to determine the approach of the head portion before the protruding motion, and it is possible to prevent an unnecessary motion.

Next, a description will be given below of a sixth embodiment in accordance with the present invention while centering on a different portion from the first embodiment mainly with reference to FIG. 8.

Figure 8:
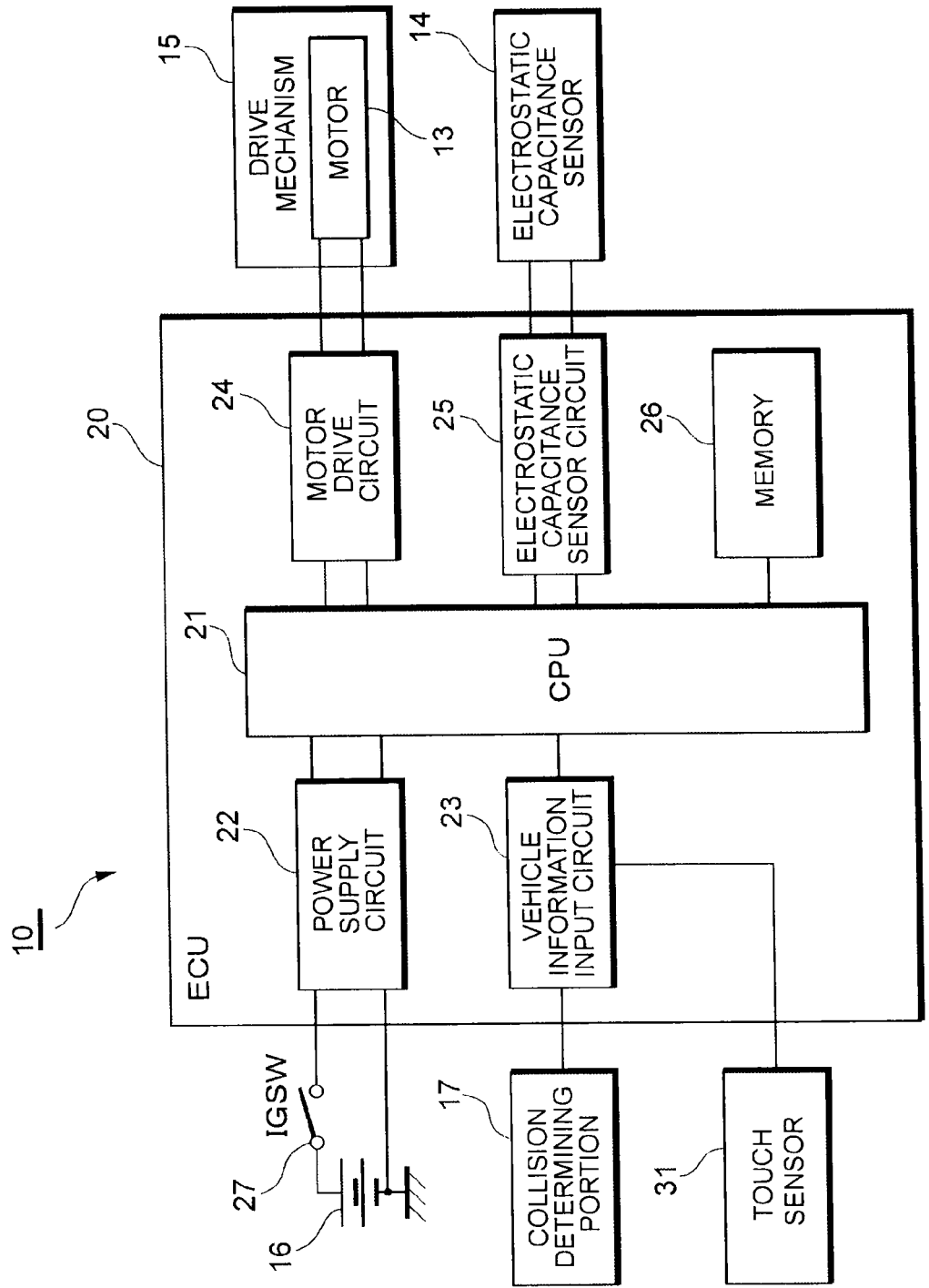
FIG. 8 is a block diagram showing the electric structure of the head rest device for the vehicle.

FIG. 8 is a block diagram showing an electric structure of a head rest device 10 for a vehicle in accordance with the sixth embodiment. In the sixth embodiment, in addition to the structure of the head rest device 10 for the vehicle in accordance with the first embodiment mentioned above, a touch sensor 31 serving as the contact detecting means detecting the contact of the head portion of the occupant and provided in the head rest front portion 12 is connected to the ECU 20.

In the sixth embodiment, in the same manner as the first embodiment, the ECU 20 determines that the head rest front portion 12 comes close to the head portion of the occupant, on the basis of the absolute capacitance change with respect to the reference electrostatic capacitance value of the electrostatic capacitance sensor 14, however, the setting method of the reference electrostatic capacitance value and the determining method of the approach of the head portion are different from the first embodiment mentioned above.

In specific, in the sixth embodiment, the CPU 21 of the ECU 20 stores an electrostatic capacitance value of the electrostatic capacitance sensor 14 at a time of the contact of the head portion of the occupant by the touch sensor 31 as the reference electrostatic capacitance value in the memory 26. In the case that a decreasing amount of the electrostatic capacitance value of the electrostatic capacitance sensor 14 with respect to the electrostatic capacitance value becomes equal to or more than the predetermined threshold value (for example, 0.4 pF), that is, in the case that the electrostatic capacitance value of the electrostatic capacitance sensor 14 with respect to the reference electrostatic capacitance value comes close to the predetermined threshold value, at a time when the collision from the backward side of the vehicle is forecasted and the head rest front portion 12 is moved in the full-open position direction, the CPU 21 determines that the head rest front portion 12 comes close to the head portion of the occupant, and stops the head rest front portion 12.

In accordance with the sixth embodiment mentioned above, in the case of storing the electrostatic capacitance value of the electrostatic capacitance sensor 14 at a time of the contact of the occupant head portion by the touch sensor 31, that is, the substantially maximum electrostatic capacitance value as the reference electric capacitance value in the memory 26, and moving the head rest front portion 12 in the full-open position direction, since it is determined that the head rest front portion 12 comes close to the head portion of the occupant at a time when the decreasing amount of the electrostatic capacitance value of the electrostatic capacitance sensor 14 with respect to the reference electrostatic capacitance value becomes within the predetermined threshold value, it is possible to precisely detect the distance with respect to the head portion of the occupant.

Further, since the reference electrostatic capacitance value is set to the electrostatic capacitance value of the electrostatic capacitance sensor 14 at a time of the contact of the head portion of the occupant by the touch sensor 31, that is, the substantially maximum electrostatic capacitance, it is possible to accurately determine the approach of the head portion of the occupant regardless of the position of the head portion of the occupant at a time of starting the protruding motion of the head rest front portion 12. For example, even in the case that the head portion of the occupant comes into contact with the head rest front portion 12 before the head rest front portion 12 moves in the full-open position direction, it is possible to determine the approach of the head portion before the protruding motion, and it is possible to prevent an unnecessary motion.

Next, a description will be given below of a seventh embodiment in accordance with the present invention while centering on a different portion from the first embodiment mainly with reference to FIG. 9.

In the seventh embodiment, as is different from the first to sixth embodiment, the ECU 20 determines that the head rest front portion 12 comes close to the head portion of the occupant on the basis of a change value of the electrostatic capacitance value of the electrostatic capacitance sensor 14.

In specific, in the seventh embodiment, in the case that the collision from the backward side of the vehicle is forecasted and the CPU 21 of the ECU 20 moves the head rest front portion 12 in the full-open position direction, the CPU 21 determines that the head rest front portion 12 comes close to the head portion of the occupant at a time when a change amount ΔC of the electrostatic capacitance value per unit time Δt (for example, 50 ms) of the electrostatic capacitance sensor 14 gets over a threshold value TH (for example, Δ0.2 pF) which is previously defined on the basis of an actuating speed of the motor 13 and the drive mechanism 15 so as to be stored in the memory 26.

In accordance with the seventh embodiment mentioned above, since it is determined that the head rest front portion 12 comes close to the head portion of the occupant at a time when the change amount ΔC of the electrostatic capacitance value per unit time Δt of the electrostatic capacitance sensor 14 gets over the threshold value TH which is previously defined on the basis of the actuating speed of the motor 13 and the drive mechanism 15, it is possible to exclude an error factor such as a temperature, a humidity or the like, and a detection precision is not changed even if a parasitic capacitance at a time when the occupant does not exist is changed. Accordingly, it is possible to further precisely detect the distance with respect to the head portion of the occupant.

In other words, on the assumption that the distance between the head portion of the occupant and the electrostatic capacitance sensor 14 is set to a horizontal axis, and the electrostatic capacitance of the electrostatic capacitance sensor 14 is set to a vertical axis, the electrostatic capacitance value becomes large little by little if the distance between the head portion of the occupant and the electrostatic capacitance sensor 14 comes close on the basis of the movement in the full-open position direction of the head rest front portion 12, as shown by a solid line in FIG. 9A. Further, in spite of a curved characteristic that a gradient is enlarged to be steep in accordance that the distance between the head portion of the occupant and the electrostatic capacitance sensor 14 comes closer, the electrostatic capacitance value is changed in the vertical axis direction while approximately keeping the curve mentioned above as shown by a broken line in FIG. 9A on the basis of the error factor such as the temperature, the humidity and the like.

However, as shown in FIG. 9B, if a time is set to the horizontal axis and a change amount ΔC of the electrostatic capacitance value is set to the vertical axis as shown in FIG. 9C by paying attention to the change amount ΔC of the electrostatic capacitance value per unit time Δt of the electrostatic capacitance sensor 14, it is possible to exclude the error factor such as the temperature, the humidity and the like.

Next, a description will be given below of an eighth embodiment in accordance with the present invention while centering on a different portion from the seventh embodiment mainly with reference to FIGS. 10 and 11.

Figure 10:
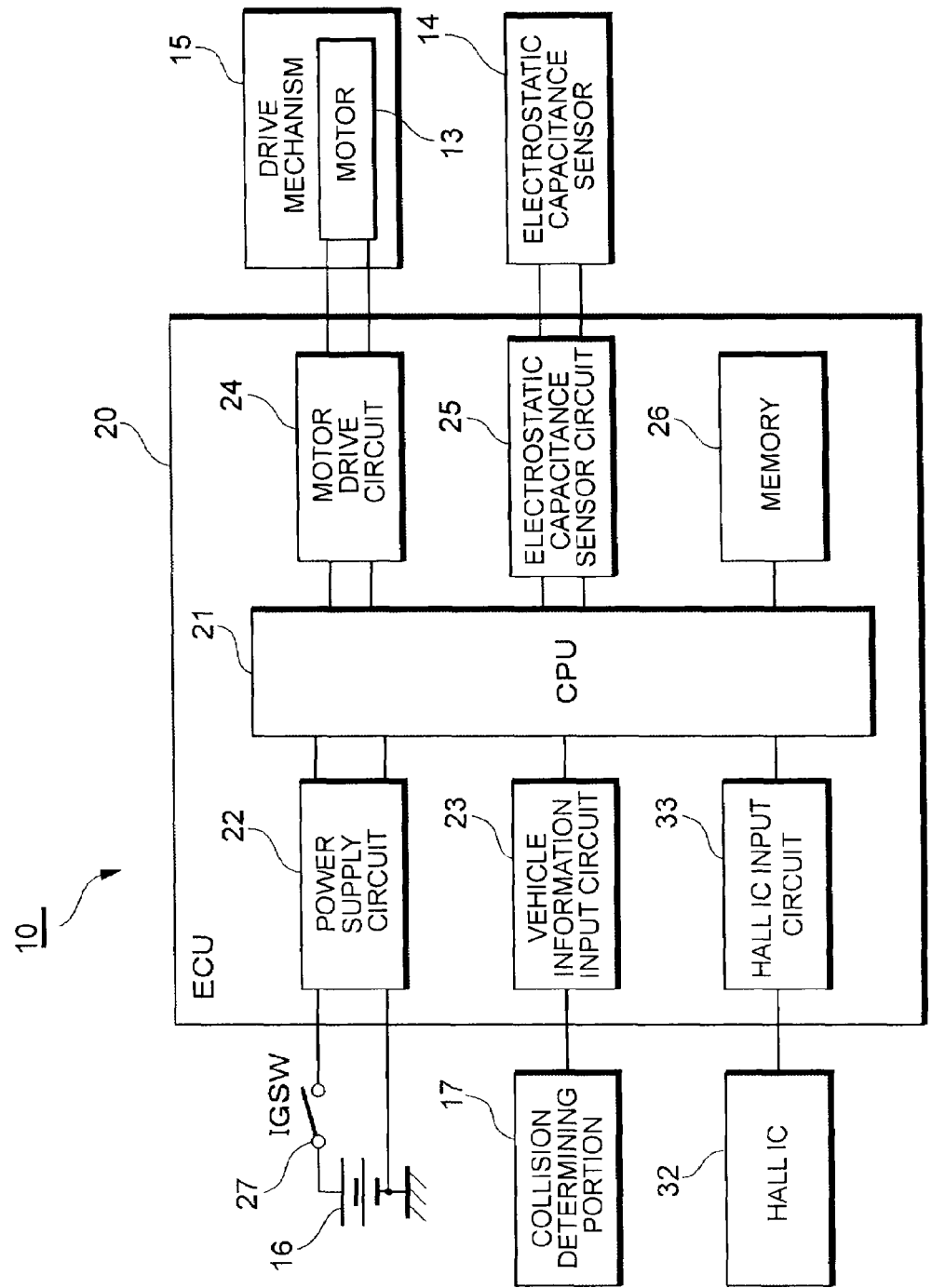
FIG. 10 is a block diagram showing the electric structure of the head rest device for the vehicle.

FIG. 10 is a block diagram showing an electric structure of a head rest device 10 for a vehicle in accordance with the eighth embodiment. In the eighth embodiment, in addition to the structure of the head rest device 10 for the vehicle in accordance with the first embodiment mentioned above, a Hall IC 32 serving as the mechanical stroke detecting means provided in the motor 13 or the drive mechanism 15 and detecting the mechanical stroke of the head rest front portion 12 is connected to a Hall IC input circuit 33 in the ECU 20.

In the eighth embodiment, in the same manner as the seventh embodiment, the ECU 20 determines that the head rest front portion 12 comes close to the head portion of the occupant on the basis of the change amount of the electrostatic capacitance value of the electrostatic capacitance sensor 14 in the same manner as the seventh embodiment, however, a determining method is different.

In specific, in the eighth embodiment, in the case that the collision from the backward side of the vehicle is forecasted and the head rest front portion 12 is moved in the full-open position direction, the CPU 21 of the ECU 20 determines that the head rest front portion 12 comes close to the head portion of the occupant at a time when a change amount ΔC of the electrostatic capacitance value of the electrostatic capacitance sensor 14 per predetermined interval ΔL (for example, stroke 4 mm) detected by the Hall IC 32 gets over a predetermined threshold value TH (for example, Δ0.2 pF), and stops the head rest front portion 12.

In accordance with the eighth embodiment mentioned above, since it is determined that the head rest front portion 12 comes close to the head portion of the occupant at a time when the change amount ΔC of the electrostatic capacitance value of the electrostatic capacitance sensor 14 per predetermined interval ΔL detected by the Hall IC 32 gets over the predetermined threshold value TH, it is possible to exclude the error factor such as the temperature, the humidity and the like, and the detection precision is not changed even if the parasitic capacitance at a time when the occupant does not exist is changed. Accordingly, it is possible to more precisely detect the distance with respect to the head portion of the occupant.

Further, since there is employed the change amount ΔC of the electrostatic capacitance value of the electrostatic capacitance sensor 14 per predetermined interval ΔL of the motor 13 or the drive mechanism 15, the detection precision is not changed even if the speed of the motor 13 and the drive mechanism 15 is changed. Accordingly, it is possible to more precisely detect the distance with respect to the head portion of the occupant.

In other words, on the assumption that the distance between the head portion of the occupant and the electrostatic capacitance sensor 14 is set to a horizontal axis, and the electrostatic capacitance of the electrostatic capacitance sensor 14 is set to a vertical axis, the electrostatic capacitance value becomes large little by little if the distance between the head portion of the occupant and the electrostatic capacitance sensor 14 comes close on the basis of the movement in the full-open position direction of the head rest front portion 12, as shown by a solid line in FIG. 11A. Further, in spite of a curved characteristic that a gradient is enlarged to be steep in accordance that the distance between the head portion of the occupant and the electrostatic capacitance sensor 14 comes closer, the electrostatic capacitance value is changed in the vertical axis direction while approximately keeping the curve mentioned above as shown by a broken line in FIG. 11A on the basis of the error factor such as the temperature, the humidity and the like.

Further, in the same manner as the seventh embodiment, if a time is set to the horizontal axis and a change amount ΔC of the electrostatic capacitance value is set to the vertical axis, it is possible to obtain a characteristic curve in which the error factor such as the temperature, the humidity and the like is excluded. However, if a factor such as a speed change of the drive mechanism is added, the characteristic is changed as shown by a broken line in FIG. 11B.

However, as shown in FIG. 11C, if the distance between the head portion of the occupant and the electrostatic capacitance sensor 14 is set to the horizontal axis and the change amount ΔC of the electrostatic capacitance value is set to the vertical axis by paying attention to the change amount ΔC of the electrostatic capacitance value of the electrostatic capacitance sensor 14 per predetermined interval ΔL of the drive mechanism, it is possible to exclude the error factor such as the speed change of the motor 13 and the drive mechanism.

Next, a description will be given below of a seventh embodiment in accordance with the present invention while centering on a different portion from the first embodiment mainly with reference to FIG. 12.

In the ninth embodiment, in the same manner as the seventh embodiment, the ECU 20 determines that the head rest front portion 12 comes close to the head portion of the occupant on the basis of the change amount of the electrostatic capacitance value of the electrostatic capacitance sensor 14 in the same manner as the seventh embodiment, however, a determining method is different.

In specific, in the ninth embodiment, in the case that the collision from the backward side of the vehicle is forecasted and the head rest front portion 12 is moved in the full-open position direction, the CPU 21 of the ECU 20 determines that the head rest front portion 12 comes close to the head portion of the occupant at a time when a ratio of the change amounts of the electrostatic capacitance values per unit time at a plurality of different times, in detail, a ratio (ΔCn/ΔCn−1) between a change amount ΔCn of the electrostatic capacitance value per unit time Δt (for example, 20 ms) at a predetermined time of the electrostatic capacitance sensor 14, and a change amount ΔCn−1 of the electrostatic capacitance value per Δt (for example, 20 ms) at a time point a predetermined time (for example, 50 ms) before the predetermined time gets over a threshold value TH (for example, 2) previously stored in the memory 26.

In accordance with the ninth embodiment mentioned above, since the CPU determines the ratio (ΔCn/ΔCn−1) of the change amount of the electrostatic capacitance value per unit time Δt of the electrostatic capacitance sensor 14 at a plurality of different times, and it is determined that the head rest front portion 12 comes close to the head portion of the occupant at a time when the ratio (ΔCn/ΔCn−1) gets over the predetermined threshold value TH, the detecting precision is not changed in accordance with an individual difference such as a magnitude and a shape of the head portion of the occupant, and a constitution or the like. Accordingly, it is possible to further precisely detect the distance with respect to the head portion of the occupant.

In other words, on the assumption that the distance between the head portion of the occupant and the electrostatic capacitance sensor 14 is set to a horizontal axis, and the electrostatic capacitance of the electrostatic capacitance sensor 14 is set to a vertical axis, the electrostatic capacitance value becomes large little by little if the distance between the head portion of the occupant and the electrostatic capacitance sensor 14 comes close on the basis of the movement in the full-open position direction of the head rest front portion 12, as shown by a solid line in FIG. 12A. Further, in spite of a curved characteristic that a gradient is enlarged to be steep in accordance that the distance between the head portion of the occupant and the electrostatic capacitance sensor 14 comes closer, the electrostatic capacitance value is changed in the vertical axis direction while approximately keeping the curve mentioned above as shown by a broken line in FIG. 12A on the basis of the individual difference such as the magnitude and the shape of the head portion of the occupant, and the constitution or the like. Accordingly, it is possible to further precisely detect the distance with respect to the head portion of the occupant.

However, as shown in FIG. 12B, paying attention to the change amount ΔCn of the electrostatic capacitance value per unit time Δt of the electrostatic capacitance sensor 14 at a predetermined time and the change amount ΔCn−1 of the electrostatic capacitance value per unit time Δt of the electrostatic capacitance sensor 14 the predetermined time before the predetermined time, if the time is set to the horizontal axis and the ration (ΔCn/ΔCn−1) is set to the vertical axis as shown in FIG. 12C, it is possible to exclude the individual difference such as the magnitude and the shape of the occupant head portion, and the constitution or the like.

On the assumption that a dielectric constant is set to ∈, an area of an electrode is set to S and a distance between the electrodes is set to d, the electrostatic capacitance C is obtained by the expression C=∈×S/d, in which ∈×S is caused by the individual difference such as the magnitude and the shape of the head portion of the occupant, and the constitution or the like so as to generate a capacitance dispersion, and C has a proportionality relation with respect to 1/d. Further, on the assumption that a distance between the head portion and an electrostatic capacitance sensor 14 is set to X [mm], the electrostatic capacitance is set to Y [pF], a change coefficient depending on the detected subject is set to a, a change coefficient depending on an initial capacitance is set to b, an actuating speed is set to v and a time is set to t [ms], the expression C=∈×S/d can be replaced by an expression Y=a/X+b.

As a result, the ratio ΔCn/ΔCn−1 is expressed as follows, and it is known that an influence of the coefficients a and b disappears.

$$\frac{\Delta C_n}{\Delta C_{n-1}} = \frac{\{a(1/X_n) + b\} - \{a(1/X_{n-1}) + b\}}{\{a(1/X_m) + b\} - \{a(1/X_{m-1}) + b\}}$$

$$= \frac{a\{(1/X_n) - (1/X_{n-1})\}}{a\{(1/X_m) - (1/X_{m-1})\}}$$

In this case, the first to ninth embodiments mentioned above may be appropriately combined. In this case, for example, in the case that any one of the combined approach determinations fastest determines that the head portion comes close to the electrostatic capacity sensor 14, it is possible to determine that the head portion comes close to the electrostatic capacitance sensor 14.

INDUSTRIAL APPLICABILITY

In accordance with the seat for the vehicle of the present invention, it is possible to precisely detect the distance with respect to the head portion of the occupant. Accordingly, the present invention can be widely applied to the seat for the vehicle having the demand mentioned above.

The invention claimed is:
1. A head rest device for a vehicle comprising:
a head rest rear portion supported to a seat back;
a head rest front portion movable forward and backward between a full-close position which is close to the head rest rear portion, and a full-open position which is away from the head rest rear portion;
a drive means moving the head rest front portion;
an electrostatic capacitance sensor provided in the head rest front portion and structured such that an electro- static capacitance is changed in accordance with a fluctuation of the distance with respect to the occupant head portion when the head rest front portion is moved relative to the head rest rear portion along a fore-and-aft direction of the vehicle; and a control means controlling the drive means and determining an approach between the head rest front portion and the occupant head portion on the basis of a detection result of the electrostatic capacitance sensor so as to stop the head rest front portion at a time of moving the head rest front portion in the full-open position direction, wherein the control means sets an electrostatic capacitance value of the electrostatic capacitance sensor at a predetermined timing to a reference electrostatic capacitance value which is changeable in correspondence to the timing, and determines that the head rest front portion comes close to the occupant head portion in the fore-and-aft direction of the vehicle on the basis of an absolute capacitance change with respect to the reference electrostatic capacitance value and a change amount of the electrostatic capacitance value per unit time.

2. The head rest device for the vehicle as claimed in claim 1, wherein the control means is structured such as to set an electrostatic capacitance value of the electrostatic capacitance sensor at a time of starting the movement of the head rest front portion in the full-open position direction to the reference electrostatic capacitance value, and determine that the head rest front portion comes close to the occupant head portion at a time when an increasing amount of the electrostatic capacitance value of the electrostatic capacitance sensor with respect to the reference electrostatic capacitance value becomes equal to or more than a predetermined threshold value.

3. The head rest device for the vehicle as claimed in claim 1, wherein the head rest device is provided with a unlock detecting means detecting an unlock of a door of the vehicle, and the control means sets an electrostatic capacitance value of the electrostatic capacitance sensor at a time of detecting the unlock of the door of the vehicle by the unlock detecting means to the reference electrostatic capacitance value, and determines that the head rest front portion comes close to the occupant head portion at a time when an increasing amount of the electrostatic capacitance value of the electrostatic capacitance sensor with respect to the reference electrostatic capacitance value becomes equal to or more than a predetermined threshold value.

4. The head rest device for the vehicle as claimed in claim 1, wherein the head rest device is provided with a door open detecting means detecting a door open of the vehicle, and the control means sets an electrostatic capacitance value of the electrostatic capacitance sensor at a time of detecting the door open of the vehicle by the door open detecting means to the reference electrostatic capacitance value, and determines that the head rest front portion comes close to the occupant head portion at a time when an increasing amount of the electrostatic capacitance value of the electrostatic capacitance sensor with respect to the reference electrostatic capacitance value becomes equal to or more than a predetermined threshold value.

5. The head rest device for the vehicle as claimed in claim 1, wherein the head rest device is provided with an ignition-on detecting means detecting an ignition-on of the vehicle, and the control means sets a minimum value of an electrostatic capacitance value of the electrostatic capacitance sensor after detecting the ignition-on by the ignition-on detecting means to the reference electrostatic capacitance value, and determines that the head rest front portion comes close to the occupant head portion at a time when an increasing amount of the electrostatic capacitance value of the electrostatic capacitance sensor with respect to the reference electrostatic capacitance value becomes equal to or more than a predetermined threshold value.

6. The head rest device for the vehicle as claimed in claim 1, wherein the head rest device is provided with an occupant detecting means detecting whether or not the occupant sits on a seat, and the control means sets an electrostatic capacitance value of the electrostatic capacitance sensor at a time when the occupant is not detected by the occupant detecting means to the reference electrostatic capacitance value, and determines that the head rest front portion comes close to the occupant head portion at a time when an increasing amount of the electrostatic capacitance value of the electrostatic capacitance sensor with respect to the reference electrostatic capacitance value becomes equal to or more than a predetermined threshold value.

7. The head rest device for the vehicle as claimed in claim 1, wherein the head rest device is provided with a contact detecting means detecting a contact of the occupant head portion with the head rest front portion, and the control means sets an electrostatic capacitance value of the electrostatic capacitance sensor at a time when the occupant head portion comes into contact by the contact detecting means to the reference electrostatic capacitance value, and determines that the head rest front portion comes close to the occupant head portion at a time when a decreasing amount of the electrostatic capacitance value of the electrostatic capacitance sensor with respect to the reference electrostatic capacitance value becomes within a predetermined threshold value.

8. The head rest device for the vehicle as claimed in claim 1, wherein the control means is provided with an electrostatic capacitance sensor circuit determining an electrostatic capacitance value of the electrostatic capacitance sensor, a memory storing the reference electrostatic capacitance value, and a central processing unit determining that the head rest front portion comes close to the occupant head portion on the basis of an absolute capacitance change with respect to the reference electrostatic capacitance value stored in the memory.

9. The head rest device for the vehicle as claimed in claim 1, wherein the electrostatic capacitance sensor comprises a single electrostatic capacitance sensor.

10. A head rest device for a vehicle comprising:

a head rest rear portion supported to a seat back;

a head rest front portion movable forward and backward between a full-close position which is close to the head rest rear portion, and a full-open position which is away from the head rest rear portion;

a drive means moving the head rest front portion;

an electrostatic capacitance sensor provided in the head rest front portion and structured such that an electrostatic capacitance is changed in accordance with a fluctuation of the distance with respect to the occupant head portion; and a control means controlling the drive means and determining an approach between the head rest front portion and the occupant head portion on the basis of a detection result of the electrostatic capacitance sensor so as to stop the head rest front portion at a time of moving the head rest front portion in the full-open position direction, wherein the control means determines that the head rest front portion comes close to the occupant head portion on the basis of a change amount of the electrostatic capacitance value of the electrostatic capacitance sensor, wherein the control means is structured such as to detect that the head rest front portion comes close to the occupant head portion at a time when the change amount of the electrostatic capacitance value per unit time of the electrostatic capacitance sensor gets over a predetermined threshold value on the basis of an actuating speed of the drive means.

11. A head rest device for a vehicle comprising:

a head rest rear portion supported to a seat back;

a head rest front portion movable forward and backward between a full-close position which is close to the head rest rear portion, and a full-open position which is away from the head rest rear portion;

a drive means moving the head rest front portion;

an electrostatic capacitance sensor provided in the head rest front portion and structured such that an electrostatic capacitance is changed in accordance with a fluctuation of the distance with respect to the occupant head portion when the head rest front portion is moved relative to the head rest rear portion along a fore-and-aft direction of the vehicle; and a control means controlling the drive means and determining an approach between the head rest front portion and the occupant head portion on the basis of a detection result of the electrostatic capacitance sensor so as to stop the head rest front portion at a time of moving the head rest front portion in the full-open position direction, wherein the control means determines that the head rest front portion comes close to the occupant head portion in the fore-and-aft direction of the vehicle on the basis of a change amount of the electrostatic capacitance value of the electrostatic capacitance sensor, wherein the drive means is provided with a mechanical stroke detecting means detecting a mechanical stroke of the head rest front portion, and the control means determines that the head rest front portion comes close to the occupant head portion at a time when a change amount of the electrostatic capacitance value per unit time of the electrostatic capacitance sensor, that corresponds to a predetermined interval detected by the mechanical stroke detecting means, gets over a predetermined threshold value.

12. The head rest device for the vehicle as claimed in claim 11, wherein the electrostatic capacitance sensor comprises a single electrostatic capacitance sensor.

13. A head rest device for a vehicle comprising:

a head rest rear portion supported to a seat back;

a head rest front portion movable forward and backward between a full-close position which is close to the head rest rear portion, and a full-open position which is away from the head rest rear portion;

a drive means moving the head rest front portion;

an electrostatic capacitance sensor provided in the head rest front portion and structured such that an electrostatic capacitance is changed in accordance with a fluctuation of the distance with respect to the occupant head portion; and a control means controlling the drive means and determining an approach between the head rest front portion and the occupant head portion on the basis of a detection result of the electrostatic capacitance sensor so as to stop the head rest front portion at a time of moving the head rest front portion in the full-open position direction, wherein the control means determines that the head rest front portion comes close to the occupant head portion on the basis of a change amount of the electrostatic capacitance value of the electrostatic capacitance sensor, wherein the control means determines that the head rest front portion comes close to the occupant head portion at a time when a ratio of change amounts of the electrostatic capacitance value per unit time of the electrostatic capacitance sensor at a plurality of different times gets over a predetermined threshold value.

14. A head rest device for a vehicle comprising:

a head rest rear portion supported to a seat back;

a head rest front portion movable forward and backward between a full-close position which is close to the head rest rear portion, and a full-open position which is away from the head rest rear portion;

a drive means moving the head rest front portion;

an electrostatic capacitance sensor provided in the head rest front portion and structured such that an electrostatic capacitance is changed in accordance with a fluctuation of the distance with respect to the occupant head portion when the head rest front portion is moved relative to the head rest rear portion along a fore-and-aft direction of the vehicle; and a control means controlling the drive means and determining an approach between the head rest front portion and the occupant head portion on the basis of a detection result of the electrostatic capacitance sensor so as to stop the head rest front portion at a time of moving the head rest front portion in the full-open position direction, wherein the control means determines that the head rest front portion comes close to the occupant head portion in the fore-and-aft direction of the vehicle on the basis of an absolute capacitance change with respect to a reference electrostatic capacitance value which is set by an electrostatic capacitance value of the electrostatic capacitance sensor at a predetermined timing and is changeable in accordance with the timing, and a change amount of the electrostatic capacitance value of the electrostatic capacitance sensor, and wherein the control means determines that the head rest front portion comes close to the occupant head portion in the case of determining that any one of an approach determination on the basis of the absolute capacitance change and an approach determination on the basis of the change amount of the electrostatic capacitance value is faster than the other.

15. The head rest device for the vehicle as claimed in claim 14, wherein the electrostatic capacitance sensor comprises a single electrostatic capacitance sensor.

16. The head rest device for the vehicle as claimed in claim 14, wherein it is determined that the head rest front portion comes close to the occupant head portion in the case of determining that any one of them comes close fastest.

17. The head rest device for the vehicle as claimed in claim 14, wherein the control means is provided with an electrostatic capacitance sensor circuit determining an electrostatic capacitance value of the electrostatic capacitance sensor, a memory storing the reference electrostatic capacitance value and a predetermined threshold value used for determining the approach between the head rest front portion and the occupant head portion, and a central processing unit determining that the head rest front portion comes close to the occupant head portion, and the central processing unit determines that the head rest front portion comes close to the occupant head portion, by using an approach determination on the basis of an absolute capacitance change with respect to the reference electrostatic capacitance value stored in the memory, and an approach determination on the basis of the threshold value and the change amount of the electrostatic capacitance value.

18. The head rest device for the vehicle as claimed in claim 17, wherein the central processing unit determined that the head rest front portion comes close to the occupant head portion, in the case of determining that one of the approach determination on the basis of the absolute capacitance change and the approach determination on the basis of the threshold value and the change amount of the electrostatic capacitance value approaches faster than the other.

19. A head rest device for a vehicle comprising:
a head rest rear portion supported to a seat back;
a head rest front portion movable forward and backward between a full-close position which is close to the head rest rear portion, and a full-open position which is away from the head rest rear portion;
a drive means moving the head rest front portion;
an electrostatic capacitance sensor provided in the head rest front portion and structured such that an electrostatic capacitance is changed in accordance with a fluctuation of the distance with respect to the occupant head portion when the head rest front portion is moved relative to the head rest rear portion along a fore-and-aft direction of the vehicle; and
a control means controlling the drive means and determining an approach between the head rest front portion and the occupant head portion on the basis of a detection result of the electrostatic capacitance sensor so as to stop the head rest front portion at a time of moving the head rest front portion in the full-open position direction,
wherein the control means determines that the head rest front portion comes close to the occupant head portion on the basis of a change amount of the electrostatic capacitance value of the electrostatic capacitance sensor,
wherein the control means is provided with an electrostatic capacitance sensor circuit determining an electrostatic capacitance value of the electrostatic capacitance sensor, a memory storing a threshold value used for determining the approach between the head rest front portion and the occupant head portion, and a central processing unit determining that the head rest front portion comes close to the occupant head portion in the fore-and-aft direction of the vehicle on the basis of the threshold value stored in the memory and a change amount of the electrostatic capacitance value of the electrostatic capacitance sensor, and
wherein the control means determines that the head rest front portion comes close to the occupant head portion at a time when the change amount of the electrostatic capacitance value per unit time of the electrostatic capacitance sensor gets over a predetermined threshold value on the basis of an actuating speed of the drive means.

* * * * *